US012643966B2

(12) United States Patent
Wang et al.

(10) Patent No.: US 12,643,966 B2
(45) Date of Patent: Jun. 2, 2026

(54) HIGH CRYSTALLINITY ETHYLENE-VINYLCYCLOHEXANE COPOLYMERS

(71) Applicant: NOVA Chemicals (International) S.A., Fribourg (CH)

(72) Inventors: XiaoChuan Wang, Calgary (CA); Peter Zoricak, Calgary (CA); Brian Molloy, Airdrie (CA)

(73) Assignee: NOVA Chemicals (International) S.A., Fribourg (CH)

( * ) Notice: Subject to any disclaimer, the term of this patent is extended or adjusted under 35 U.S.C. 154(b) by 515 days.

(21) Appl. No.: 18/252,772

(22) PCT Filed: Dec. 3, 2021

(86) PCT No.: PCT/IB2021/061324
§ 371 (c)(1),
(2) Date: May 12, 2023

(87) PCT Pub. No.: WO2022/123413
PCT Pub. Date: Jun. 16, 2022

(65) Prior Publication Data
US 2023/0416429 A1 Dec. 28, 2023

Related U.S. Application Data

(60) Provisional application No. 63/124,620, filed on Dec. 11, 2020.

(51) Int. Cl.
*C08F 210/16* (2006.01)
*C08F 4/659* (2006.01)
*C08J 5/18* (2006.01)

(52) U.S. Cl.
CPC ........ *C08F 210/16* (2013.01); *C08F 4/65908* (2013.01); *C08F 4/65912* (2013.01); *C08J 5/18* (2013.01); *C08J 2323/08* (2013.01)

(58) Field of Classification Search
CPC .............. C08J 5/18; C08F 4/76; C08F 210/16
See application file for complete search history.

(56) References Cited

U.S. PATENT DOCUMENTS

| | | | | |
|---|---|---|---|---|
| 6,288,193 | B1 * | 9/2001 | Iseki | C08F 210/02 556/11 |
| 6,372,864 | B1 | 4/2002 | Brown | |
| 6,777,509 | B2 | 8/2004 | Brown et al. | |
| 7,037,563 | B2 | 5/2006 | Oi et al. | |
| 2020/0079887 | A1 * | 3/2020 | Ajellal | C08F 210/16 |

FOREIGN PATENT DOCUMENTS

| | | |
|---|---|---|
| CA | 2868640 A1 | 4/2016 |

OTHER PUBLICATIONS

Aitola et al., "Copolymerization of Vinylcylohexane with Ethene and Propene Using Zirconocene Catalysts", Journal of Polymer Science: Part A: Polymer Chemistry, vol. 44, 2006, pp. 6569-6574.
ASTM D1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10 (pp. 1-16).
ASTM D1525-17—Standard Test Method for Vicat Softening Temperature of Plastics—Copyright ASTM International—Current edition approved Aug. 1, 2017. Published Aug. 2017. Originally approved in 1958. Last previous edition approved in 2009 as D1525-09 (pp. 1-11).
ASTM D3985-17—Standard Test Method for Oxygen Gas Transmission Rate Through Plastic Film and Sheeting Using a Coulometric Sensor—Copyright ASTM International—Current edition approved Nov. 15, 2017. Published Dec. 2017. Originally approved in 1981. Last previous edition approved in 2010 as D3985-05 (pp. 1-7).
ASTM D6474-12—Standard Test Method for Determining Molecular Weight Distribution and Molecular Weight Averages of Polyolefins by High Temperature Gel Permeation Chromatography—Copyright ASTM International—Current edition approved Dec. 15, 2012. Published Dec. 2012. Originally approved in 1999. Last previous edition approved in 2006 as D6474-99 (pp. 1-6).
ASTM D792-13—Standard Test Methods for Density and Specific Gravity (Relative Density) of Plastics by Displacement—Copyright ASTM International—Current edition approved Nov. 1, 2013 Published Nov. 2013. Originally approved in 1944. Last previous edition approved in 2008 as D792-08 (pp. 1-6).
ASTM F1249-90—Standard Test Method for Water Vapor Transmission Rate Through Plastic Film and Sheeting Using a Modulated Infrared Sensor—Copyright ASTM International—Current edition approved Jul. 27, 1990. Published Sep. 1990. Originally published as F1249-89. Last previous edition F1249-89 (pp. 1-5).
International Search Report and Written Opinion on PCT/IB2021/061324 dated Mar. 9, 2022.
Mani et al., "Copolymerization of Ethylene and Vinylcylohexane Using Soluble Ziegler-Natta Catalysts", Polymer, vol. 34, No. 9, 1993, pp. 1941-1945.
Nomura et al., "Efficient Incorporation of Vinylcylohexane in Ethylene/Vinylcylohexane Copolymerization Catalyzed by Nonbridged Half-Titanocenes", Macromolecules, vol. 38, No. 20, 2005, pp. 8121-8123.
Wang et al., "Identification of Thermoformability Indicators For Multilayer Films", Annual Technical Conference of the Society of Plastics Engineers, May 16-20, 2010, Orlando, Florida, USA.

* cited by examiner

*Primary Examiner* — Christopher M Rodd
(74) *Attorney, Agent, or Firm* — Thomas J. Styslinger

(57) ABSTRACT

The copolymerization of ethylene with vinylcyclohexane is carried out with a catalyst system comprising a bridged hafnocene. When relatively low levels of vinylcyclohexane are incorporated, the ethylene-vinylcyclohexane copolymers have high degrees of crystallinity as measured by differential scanning calorimetry (Xc in %). These copolymers have good thermoformability.

3 Claims, 7 Drawing Sheets

HIGH CRYSTALLINITY ETHYLENE-VINYLCYCLOHEXANE COPOLYMERS

CROSS-REFERENCE TO RELATED APPLICATIONS

This application is a U.S. National Phase Application under 35 U.S.C. 371 of International Patent Application No. PCT/IB2021/061324, filed on Dec. 3, 2021, which in turn claims to and the benefit priority of U.S. Provisional Application No. 63/124,620, filed on Dec. 11, 2020, both of which are incorporated herein by reference in their entirety.

TECHNICAL FIELD

The present disclosure utilizes a bridged hafnocene catalyst to copolymerize ethylene with vinylcyclohexane. The resultant copolymers, which have high degrees of crystallinity (Xc by DSC of >38%), have useful thermoformability properties.

BACKGROUND ART

Although the copolymerization of ethylene with vinylcyclohexane is known, due to the relatively large steric bulk of vinylcyclohexane, incorporation of this comonomer can be difficult with single site catalysts. Indeed, in some of the earliest reports employing traditional unbridged zirconocene polymerization catalysts, vinylcyclohexane uptake into a copolymer with ethylene was limited and the copolymer had low molecular weight (see Mani R. and Burns C. M. in *Polymer* 1993, 34, p. 1941). Somewhat higher levels of vinylcyclohexane incorporation and higher molecular weights have been achieved using other single site zirconocene catalysts, such as a bridged bis indenyl zirconocene catalyst (see Erkki Aitola et. al. in *Journal of Polymer Science: Part A: Polymer Chemistry,* 2006, 44(22), p. 6569), while still higher levels of vinylcyclohexane incorporation into a copolymer with ethylene has been achieved using non bridged half titanocene catalysts (see Nomura K. and Itagaki K. in Macromolecules, 38(20), p. 8121). The use of bridged half sandwich catalysts based on titanium to make copolymers of ethylene and vinylcyclohexane has been disclosed in U.S. Pat. Nos. 6,288,193 and 7,037,563 and the copolymers, which have relatively low amounts of vinylcyclohexane are reported to have good mechanical strength, processability and transparency.

SUMMARY OF INVENTION

We now report the use of a bridged hafnocene catalyst to copolymerize ethylene with vinylcyclohexane to produce copolymers having high crystallinity and long chain branching. The copolymers are expected to exhibit good thermoformability when made into a thermoformed film.

An embodiment of the disclosure is a process for the copolymerizaton of ethylene and vinylcyclohexane wherein the process is carried out using a polymerization catalyst system comprising: a) a bridged hafnocene having the formula (I):

(I)

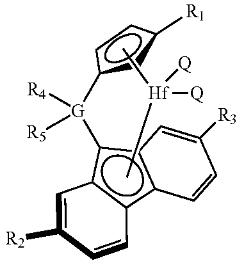

wherein G is a group 14 element selected from carbon, silicon, germanium, tin or lead; $R_1$ is a hydrogen atom, an unsubstituted $C_{1-20}$ hydrocarbyl radical, a substituted $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical; $R_4$ and $R_5$ are independently selected from a hydrogen atom, an unsubstituted $C_{1-20}$ hydrocarbyl radical, a substituted $C_{1-20}$ hydrocarbyl radical, a $C_{1-20}$ alkoxy radical or a $C_{6-10}$ aryl oxide radical; and Q is independently an activatable leaving group ligand; and b) a catalyst activator; wherein the process produces an ethylene-vinylcyclohexane copolymer having a vinylcyclohexane content of from 0.25 to 5 mol %; a crystallinity (Xc) of >38%; a phase angle (δ) at a complex modulus (G*) of 10,000 Pa, of ≤75°; and an average melt strain hardening index (MSHI) of ≤1.7.

An embodiment of the disclosure is an ethylene-vinylcyclohexane copolymer having a vinylcyclohexane content of from 0.25 to 5 mol %; a crystallinity (Xc) of >38%; a phase angle (δ) at a complex modulus (G*) of 10,000 Pa, of ≤75°; and an average melt strain hardening index (MSHI) of ≤1.7.

In an embodiment of the disclosure, an ethylene-vinylcyclohexane copolymer has a density of from 0.900 to 0.965 $g/cm^3$.

In an embodiment of the disclosure, an ethylene-vinylcyclohexane copolymer has an area dimensional thermoformability index (aDTI) at 105° C. of less than 7.0.

An embodiment of the disclosure is a film comprising an ethylene-vinylcyclohexane copolymer, the ethylene-vinylcyclohexane copolymer having a vinylcyclohexane content of from 0.25 to 5 mol %; a crystallinity (Xc) of >38%; a phase angle (δ) at a complex modulus (G*) of 10,000 Pa, of ≤75°; and an average melt strain hardening index (MSHI) of ≤1.7.

An embodiment of the disclosure is a film comprising an ethylene-vinylcyclohexane copolymer, the ethylene-vinylcyclohexane copolymer having a density of from 0.900 to $g/cm^3$.

An embodiment of the disclosure is a film comprising an ethylene-vinylcyclohexane copolymer, the ethylene-vinylcyclohexane copolymer having an area dimensional thermoformability index (aDTI) at 105° C. of less than 7.0.

BRIEF DESCRIPTION OF THE DRAWINGS

FIG. 2 also shows a plot of the loss modulus E" (in Pa) vs. temperature for a comparative polyethylene/1-octene copolymer material.

FIG. 3 also shows the corresponding data for some comparative polymer materials.

In FIG. 5, "d" is the thickness of the specimen and "W" is the width of the specimen.

DESCRIPTION OF EMBODIMENTS

Figure 1:
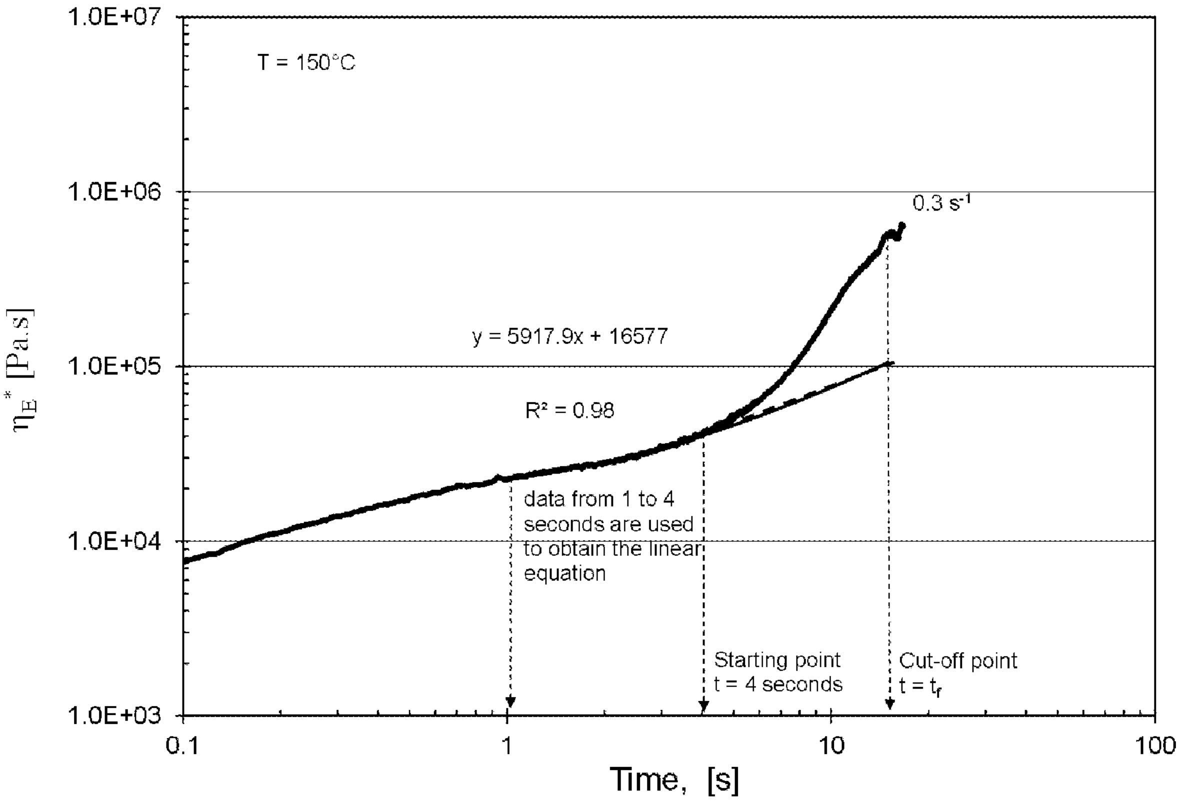
FIG. 1 shows an example in which a plot of time, t (in seconds) vs. transient extensional viscosity, $\eta_E$* (in Pa·s) is used to determine the average Melt Strain Hardening Index, the "MSHI".

The following terms are used throughout as defined below.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "monomer" refers to a small molecule that may chemically react and become chemically bonded with itself or other monomers to form a polymer.

As used herein, the term "α-olefin" or "alpha-olefin" is used to describe a monomer having a linear hydrocarbon chain containing from 3 to 20 carbon atoms having a double bond at one end of the chain; an equivalent term is "linear α-olefin".

As used herein, the term "polyethylene" or "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. An "ethylene homopolymer" for example, is made using only ethylene as a polymerizable monomer. The term "copolymer" refers to a polymer that contains two or more types of monomer. An "ethylene copolymer" is made using ethylene and one or more other types of polymerizable monomer. Common polyethylenes include high density polyethylene (HDPE), medium density polyethylene (MDPE), linear low density polyethylene (LLDPE), very low density polyethylene (VLDPE), ultralow density polyethylene (ULDPE), plastomer and elastomers. The term polyethylene also includes polyethylene terpolymers which may include two or more comonomers in addition to ethylene. The term polyethylene also includes combinations of, or blends of, the polyethylenes described above.

The term "ethylene-vinylcyclohexane copolymer" refers to an ethylene copolymer comprising at least ethylene and vinylcyclohexane as polymerized monomers but may also contain small amounts of other polymerizable alpha-olefins (i.e. other alpha-olefins can be present in less than 1 mol %).

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein the term "multilayer film" or "multilayer film structure" refers to a film comprised of more than one thermoplastic layer, or optionally non-thermoplastic layers. Non-limiting examples of non-thermoplastic materials include metals (foil) or cellulosic (paper) products. One or more of the thermoplastic layers within a multilayer film (or film structure) may be comprised of more than one thermoplastic.

As used herein, the term "tie resin" refers to a thermoplastic that when formed into an intermediate layer, or a "tie layer" within a multilayer film structure, promotes adhesion between adjacent film layers that are dissimilar in chemical composition.

As used herein, the term "sealant layer" refers to a layer of thermoplastic film that is capable of being attached to a second substrate, forming a leak proof seal. A "sealant layer" may be a skin layer or the innermost layer in a multilayer film structure.

As used herein, the term "adhesive lamination" and the term "extrusion lamination" describes continuous processes through which two or more substrates, or webs of material, are combined to form a multilayer product or sheet; wherein the two or more webs are joined using an adhesive or a molten thermoplastic film, respectively.

As used herein, the term "extrusion coating" describes a continuous process through which a molten thermoplastic layer is combined with, or deposited on, a moving solid web or substrate. Non-limiting examples of substrates include paper, paperboard, foil, monolayer plastic film, multilayer plastic film or fabric. The molten thermoplastic layer could be monolayer or multilayer.

As used herein, the terms "hydrocarbyl", "hydrocarbyl radical" or "hydrocarbyl group" refers to linear or branched, aliphatic, olefinic, acetylenic and aryl (aromatic) radicals comprising hydrogen and carbon that are deficient by one hydrogen. The term "cyclic hydrocarbyl group" connotes hydrocarbyl groups that comprise cyclic moieties and which may have one or more than one cyclic aromatic ring, and/or one or more than one non-aromatic ring. The term "acyclic hydrocarbyl group" connotes hydrocarbyl groups that do not have cyclic moieties such as aromatic or non-aromatic ring structures present within them.

As used herein, the term "heteroatom" includes any atom other than carbon and hydrogen that can be bound to carbon. The term "heteroatom containing" or "heteroatom containing hydrocarbyl group" means that one or more than one non carbon atom(s) may be present in the hydrocarbyl groups. Some non-limiting examples of non-carbon atoms that may be present is a heteroatom containing hydrocarbyl group are N, O, S, P and Si as well as halides such as for example Br and metals such as Sn. Some non-limiting examples of heteroatom containing hydrocarbyl groups include for example imines, amine moieties, oxide moieties, phosphine moieties, ethers, ketones, heterocyclics, oxazolines, thioethers, and the like.

In an embodiment of the disclosure, a heteroatom containing hydrocarbyl group is a hydrocarbyl group containing from 1 to 3 atoms selected from the group consisting of boron, aluminum, silicon, germanium, nitrogen, phosphorous, oxygen and sulfur.

The terms "cyclic heteroatom containing hydrocarbyl" or "heterocyclic" refer to ring systems having a carbon backbone that further comprises at least one heteroatom selected from the group consisting of for example boron, aluminum, silicon, germanium, nitrogen, phosphorous, oxygen and sulfur.

In an embodiment of the disclosure, a cyclic heteroatom containing hydrocarbyl group is a cyclic hydrocarbyl group containing from 1 to 3 atoms selected from the group consisting of boron, aluminum, silicon, germanium, nitrogen, phosphorous, oxygen and sulfur.

As used herein, an "alkyl radical" or "alkyl group" includes linear, branched and cyclic paraffin radicals that are deficient by one hydrogen radical; non-limiting examples include methyl ($—CH_3$) and ethyl ($—CH_2CH_3$) radicals. The term "alkenyl radical" or "alkenyl group" refers to linear, branched and cyclic hydrocarbons containing at least one carbon-carbon double bond that is deficient by one hydrogen radical. The term "alkynyl radical" or "alkynyl group" refers to linear, branched and cyclic hydrocarbons containing at least one carbon-carbon triple bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "alkylaryl" group is an alkyl group having an aryl group pendant there from; non-limiting examples include benzyl, phenethyl and tolylmethyl. An "arylalkyl" is an aryl group having one or more alkyl groups pendant there from; non-limiting examples include tolyl, xylyl, mesityl and cumyl.

An "alkoxy" group (or radical) is an oxy group having an alkyl group pendant there from; and includes for example a methoxy group, an ethoxy group, an iso-propoxy group, and the like.

An "aryloxy" group (or radical) is an oxy group having an aryl group pendant there from; and includes for example a phenoxy group and the like.

As used herein the term "unsubstituted" means that hydrogen radicals are bounded to the molecular group that is referred to by the term unsubstituted. The term "substituted" means that the group referred to by this term possesses one or more moieties (i.e. non hydrogen radicals) that have replaced one or more hydrogen radicals in any position within the group; non-limiting examples of moieties include halogen radicals (F, Cl, Br), an alkyl group, an alkylaryl group, an arylalkyl group, an alkoxy group, an aryl group, an aryloxy group, an amido group, a silyl group or a germanyl group, hydroxyl groups, carbonyl groups, carboxyl groups, amine groups, phosphine groups, phenyl groups, naphthyl groups, $C_1$ to $C_{30}$ alkyl groups, $C_2$ to $C_{30}$ alkenyl groups, and combinations thereof.

In an embodiment of the present disclosure, an ethylene copolymer will comprise ethylene and vinylcyclohexane.

In an embodiment of the present disclosure, an ethylene copolymer will comprise ethylene, vinylcyclohexane and one or more other polymerizable alpha-olefin monomers.

In an embodiment of the disclosure an ethylene copolymer will comprise only ethylene and vinylcyclohexane.

In an embodiment of the disclosure an ethylene-vinylcyclohexane copolymer is made by copolymerizing ethylene and vinylcyclohexane as the only deliberately added monomers to a polymerization process.

In embodiments of the present disclosure ethylene and vinylcyclohexane are copolymerized with a polymerization catalyst system comprising: a) a bridged hafnocene having the formula (I):

(I)

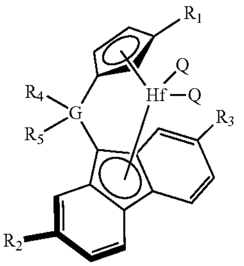

wherein G is a group 14 element selected from carbon, silicon, germanium, tin or lead; $R_1$ is a hydrogen atom, an unsubstituted $C_{1-20}$ hydrocarbyl radical, a substituted $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical; $R_4$ and $R_5$ are independently selected from a hydrogen atom, an unsubstituted $C_{1-20}$ hydrocarbyl radical, a substituted $C_{1-20}$ hydrocarbyl radical, a $C_{1-20}$ alkoxy radical or a $C_{6-10}$ aryl oxide radical; and Q is independently an activatable leaving group ligand; and b) a catalyst activator.

In an embodiment, $R_4$ and $R_5$ are independently an aryl group.

In an embodiment, $R_4$ and $R_5$ are independently a phenyl group or a substituted phenyl group.

In an embodiment, $R_4$ and $R_5$ are a phenyl group.

In an embodiment, $R_4$ and $R_5$ are independently a substituted phenyl group.

In an embodiment, $R_4$ and $R_5$ are a substituted phenyl group, wherein the phenyl group is substituted with a substituted silyl group.

In an embodiment, $R_4$ and $R_5$ are a substituted phenyl group, wherein the phenyl group is substituted with a trialkyl silyl group.

In an embodiment, $R_4$ and $R_5$ are a substituted phenyl group, wherein the phenyl group is substituted at the para position with a trialkylsilyl group. In an embodiment, $R_4$ and $R_5$ are a substituted phenyl group, wherein the phenyl group is substituted at the para position with a trimethylsilyl group. In an embodiment, $R_4$ and $R_5$ are a substituted phenyl group, wherein the phenyl group is substituted at the para position with a triethylsilyl group.

In an embodiment, $R_4$ and $R_5$ are independently an alkyl group.

In an embodiment, $R_4$ and $R_5$ are independently an alkenyl group.

In an embodiment, $R_1$ is hydrogen.

In an embodiment, $R_1$ is an alkyl group.

In an embodiment, $R_1$ is an aryl group.

In an embodiment, $R_1$ is an alkenyl group.

In an embodiment, $R_2$ and $R_3$ are independently a hydrocarbyl group having from 1 to 30 carbon atoms.

In an embodiment, $R_2$ and $R_3$ are independently an aryl group.

In an embodiment, $R_2$ and $R_3$ are independently an alkyl group.

In an embodiment, $R_2$ and $R_3$ are independently an alkyl group having from 1 to 20 carbon atoms.

In an embodiment, $R_2$ and $R_3$ are independently a phenyl group or a substituted phenyl group.

In an embodiment, $R_2$ and $R_3$ are a tert-butyl group.

In an embodiment, $R_2$ and $R_3$ are hydrogen.

In the current disclosure, the term "activatable", means that the ligand Q may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand Q may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present disclosure, the activatable ligand, Q is independently selected from the group consisting of a hydrogen atom; a halogen atom; a $C_{1-20}$ hydrocarbyl radical, a $C_{1-20}$ alkoxy radical, and a $C_{6-10}$ aryl or aryloxy radical, where each of the hydrocarbyl, alkoxy, aryl, or aryl oxide radicals may be un-substituted or further substituted by one or more halogen or other group; a $C_{1-8}$ alkyl; a $C_{1-8}$ alkoxy; a $C_{6-10}$ aryl or aryloxy; an amido or a phosphido radical, but where Q is not a cyclopentadienyl. Two Q ligands may also be joined to one another and form for example, a substituted or unsubstituted diene ligand (e.g. 1,3-butadiene); or a delocalized heteroatom containing group such as an acetate or acetamidinate group.

In an embodiment of the disclosure, each Q is independently selected from the group consisting of a halide atom, a $C_{1-4}$ alkyl radical and a benzyl radical.

In an embodiment of the disclosure, each Q is a monoanionic group such as a halide (e.g. chloride) or a hydrocarbyl (e.g. methyl, benzyl).

In an embodiment of the disclosure, the bridged hafnocene is diphenylmethylene(cyclopentadienyl)(2,7-di-t-butylfluorenyl)hafnium dichloride having the molecular formula: $[(2,7\text{-}tBu_2Flu)Ph_2C(Cp)HfCl_2]$.

In an embodiment of the disclosure the bridged hafnocene is diphenylmethylene(cyclopentadienyl)(2,7-di-t-butylfluorenyl)hafnium dimethyl having the molecular formula: $[(2,7\text{-}tBu_2Flu)Ph_2C(Cp)HfMe_2]$.

In an embodiment of the disclosure, the catalyst activator comprises: i) an alkylaluminoxane; ii) an ionic activator; and optionally iii) a hindered phenol. Although the exact structure of alkylaluminoxane is uncertain, subject matter experts generally agree that it is an oligomeric species that contain repeating units of the general formula: $(R)_2AlO—(Al(R)—O)_n—Al(R)_2$ where the R groups may be the same or different linear, branched or cyclic hydrocarbyl radicals containing 1 to 20 carbon atoms and n is from 0 to about 50. A non-limiting example of an alkylaluminoxane is methylaluminoxane (or MAO) wherein each R group is a methyl radical.

In an embodiment of the disclosure, R of the alkylaluminoxane, is a methyl radical and m is from 10 to 40.

In an embodiment of the disclosure, the co-catalyst is modified methylaluminoxane (MMAO).

It is well known in the art, that the alkylaluminoxane can serve dual roles as both an alkylator and an activator. Hence, an alkylaluminoxane co-catalyst is often used in combination with activatable ligands such as halogens.

In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas shown below:

$$[R^6]^+[B(R^7)_4]^-$$

where B represents a boron atom, $R^6$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula $—Si(R^9)_3$, where each $R^9$ is independently selected from hydrogen atoms and $C_{1-4}$ alkyl radicals, and $$[(R^8)_tZH]^+[B(R^7)_4]^-$$

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and R 7 is as defined above.

In both formula a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl)boron, tripropylammonium tetra(phenyl)boron, tri(n-butyl)ammonium tetra (phenyl)boron, trimethylammonium tetra(p-tolyl)boron, trimethylammonium tetra(o-tolyl)boron, tributylammonium tetra(pentafluorophenyl)boron, tripropylammonium tetra(o, p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

In an embodiment, the ionic activator is selected from the group consisting of commercially available activators such as N,N-dimethylaniliniumtetrakispentafluorophenyl borate ("$[Me_2NHPh][B(C_6F_5)_4]$"); triphenylmethylium tetrakispentafluorophenyl borate ("$[Ph_3C][B(C_6F_5)_4]$"); and trispentafluorophenyl boron.

In an embodiment of the disclosure, the ionic activator compounds may be used in amounts which provide a molar ratio of hafnium (from the bridged hafnocene) to boron that will be from 1:1 to 1:6.

As used herein, the term hindered phenol is meant to refer to a phenol or bis phenol molecule having at least two substituents. In an embodiment, each substituent is a $C_1$ to $C_{20}$ hydrocarbyl. Non-limiting examples of hindered phenols include butylated phenolic antioxidants, butylated hydroxytoluene, 2,4-di-tertiarybutyl-6-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

In an embodiment, the mole ratio of the hindered phenol to the molar amount of aluminum in the alkylaluminoxane is from 0.1/1.0 to 0.5/1.0.

The ethylene-vinylcyclohexane copolymers of the present disclosure may be made by any one of several different polymerization processes known to persons skilled in the art, such as for example a solution phase process, a slurry phase process, or a gas phase process.

In an embodiment of the disclosure, a solution phase polymerization process is used to make the ethylene-vinylcyclohexane copolymers.

An example of a solution polymerization which may be used in an embodiment of the disclosure has been described in Canadian Patent Application No. 2,868,640, filed Oct. 21, 2014 and entitled "Solution Polymerization Process". Embodiments of this solution process includes at least two continuously stirred reactors, $R_1$ and $R_2$ and an optional tubular reactor, $R_3$. Feeds (solvent, monomers, catalyst and optional hydrogen) are fed to the two reactors continuously. A catalyst deactivator may be added to the exit stream producing a deactivated solution. The deactivated solution passes through a pressure let down device, a heat exchanger and a passivator is added forming a passivated solution. The passivated solution passes through a series of vapor liquid separators and ultimately the ethylene copolymer product enters a polymer recovery section. Non-limiting examples of polymer recovery operations include one or more gear pump, single screw extruder or twin screw extruder that forces the molten ethylene interpolymer product through a pelletizer. A variety of solvents may be used as the process solvent; non-limiting examples include linear, branched or cyclic $C_5$ to $C_{12}$ alkanes. It is well known to individuals of ordinary experience in the art that reactor feed streams (solvent, monomers, α-olefin, hydrogen, catalyst formulation etc.) should be essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene.

Solution polymerization processes for the copolymerization of ethylene with alpha-olefins, and which may be employed in embodiments of the present disclosure, are also described in U.S. Pat. Nos. 6,372,864 and 6,777,509. These processes are conducted in the presence of an inert hydrocarbon solvent, typically, a $C_{5-12}$ hydrocarbon which may be unsubstituted or substituted by $C_{1-4}$ alkyl group such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The polymerization temperature in a conventional solution phase polymerization process may be from about 80° C. to about 300° C. In an embodiment of the disclosure the polymerization temperature in a solution process is from about 120° C. to about 250° C.

The polymerization pressure in a solution phase polymerization process may be a "medium pressure process", meaning that the pressure in the reactor is less than about 6,000 psi (about 42,000 kiloPascals or kPa). In an embodiment of the disclosure, the polymerization pressure in a solution process may be from about 10,000 to about 40,000 kPa, or from about 14,000 to about 22,000 kPa (i.e. from about 2,000 psi to about 3,000 psi).

In an embodiments of the disclosure, an ethylene-vinylcyclohexane copolymer has a vinylcyclohexane content from 0.10 to 10.0 mol %, or from 0.10 to 7.5 mol %, or 0.25 to 7.5 mol %, or from 0.10 to 5.0 mol %, or from 0.25 to 5 mol %, or from 0.10 to 3.0 mol %, or from 0.25 to 3.0 mol %, or from 0.10 to 2.5 mol %, or from 0.25 to 2.5 mol %, or from 0.25 to less than 2.5 mol %, or from 0.10 to 2.0 mol %, or from 0.25 to 2.0 mol %, or less than 7.0 mol %, or less than 5.0 mol %, or less than 3.0 mol %, or less than 2.5 mol %, or less than 2.0 mol %.

In embodiments of the disclosure, the upper limit on the density of the ethylene-vinylcyclohexane copolymer is 0.965 g/$cm^3$, or 0.960 g/$cm^3$, or 0.955 g/$cm^3$, or 0.950 g/$cm^3$, or 0.945 g/$cm^3$. In embodiments of the disclosure, the lower limit on the density of the ethylene-vinylcyclohexane copolymer is 0.895 g/$cm^3$, or 0.900 g/$cm^3$, or 0.905 g/$cm^3$, or g/$cm^3$, or 0.915 g/$cm^3$.

In embodiments of the disclosure, an ethylene-vinylcyclohexane copolymer has a density of from 0.895 to 0.965 g/$cm^3$, or from 0.900 to 0.965 g/$cm^3$, or from 0.905 to 0.965 g/$cm^3$, or from 0.910 to 0.965 g/$cm^3$, or from 0.915 to 0.965 g/$cm^3$, or from 0.895 to 0.960 g/$cm^3$, or from 0.900 to 0.960 g/$cm^3$, or from 0.905 to 0.960 g/$cm^3$, or from 0.910 to 0.960 g/$cm^3$, or from 0.915 to 0.960 g/$cm^3$, or from 0.895 to 0.955 g/$cm^3$, or from 0.900 to 0.955 g/$cm^3$, or from 0.905 to 0.955 g/$cm^3$, or from 0.910 to 0.955 g/$cm^3$, or from 0.915 to 0.955 g/$cm^3$, or from 0.895 to 0.950 g/$cm^3$, or from 0.900 to 0.950 g/$cm^3$, or from 0.905 to 0.950 g/$cm^3$, or from 0.910 to 0.950 g/$cm^3$, or from 0.915 to 0.950 g/$cm^3$, or from 0.912 to 0.950 g/$cm^3$, or from 0.912 to 0.945 g/$cm^3$, or from 0.915 to 0.945 g/$cm^3$.

In embodiments of the disclosure, the ethylene-vinylcyclohexane copolymer has from 0 to 7 methyl branches per 1000 carbon atoms (i.e. per thousand polymer backbone carbon atoms), or from 0 to 5 methyl branches per 1000 carbon atoms, or from 0 to 3 methyl branches per 1000 carbon atoms, or from 0 to 2.5 methyl branches per 1000 carbon atoms, or fewer than 5 methyl branches per 1000 carbon atoms, or fewer than 3 methyl branches per 1000 carbon atoms, or fewer than 2.5 methyl branches per 1000 carbon atoms.

In embodiments of the disclosure, the ethylene-vinylcyclohexane copolymer has a melt index of from 0.01 to 10.0 g/10 min, or from 0.01 to 10.0 g/10 min, or from 0.01 to 5.0 g/10 min, or from 0.01 to 3.0 g/10 min.

In embodiments of the disclosure, the ethylene-vinylcyclohexane copolymer has a weight average molecular weight (M w), determined by conventional GPC, of from about to about 350,000, or from about 45,000 to about 300,000, or from about 50,000 to about 275,000.

In embodiments of the disclosure, the ethylene-vinylcyclohexane copolymer has a molecular weight distribution ($M_w/M_n$), determined by conventional GPC, of from 1.7 to or from 1.7 to 3.0, or from 1.7 to 2.5, or from 1.8 to 2.5, or from 1.9 to 2.5, or from 1.7 to 2.3, or from 1.8 to 2.3, or from 1.9 to 2.3 or about 2.

In embodiments of the disclosure, the ethylene-vinylcyclohexane copolymer has a glass transition temperature (Tg) determined by dynamic mechanical thermal analysis (DMTA) of <30° C., or <20° C., of <10° C., or <0° C., or <−10° C. In embodiments of the disclosure, the ethylene-vinylcyclohexane copolymer has a glass transition temperature (Tg) determined by dynamic mechanical thermal analysis (DMTA) of from −80° C. to 10° C., or from −75° C. to 5° C., or from −75° C. to 0° C. or from −70° C. to 0° C.

In embodiments of the disclosure, the ethylene-vinylcyclohexane copolymer has a degree of crystallinity (Xc) as determined by differential scanning calorimetry (DSC) of ≥38%, or ≥38%, or ≥39%, or ≥39%, or ≥40%, or ≥40%.

In embodiments of the disclosure, the ethylene-vinylcyclohexane copolymer has a degree of crystallinity (Xc) as determined by differential scanning calorimetry (DSC) of from 38% to 75%, or from greater than 38% to 75%, or from 38% to 70%, or from greater than 38% to 70%, or from 38% to 65%, or from greater than 38% to 65%, or from 38% to 60%, or from greater than 38% to 60%, or from 38% to 55%, or from greater than 38% to 55%, or from 39 to 60%, or from 40 to 60%, or from 39 to 55%, or from 40 to 55%.

In embodiments of the disclosure, the ethylene-vinylcyclohexane copolymer has a phase angle (δ) at a complex modulus (G*) of 10,000 Pa, of ≤77°, or ≤77°, or ≤75°, or <75°, or ≤70°, or <70°, or ≤65°, or <65°. In embodiments of the disclosure, the ethylene-vinylcyclohexane copolymer has a phase angle (δ) at a complex modulus (G*) of 10,000 Pa, of from 25° to 77°, or from 25° to 75°, or from 30° to 77°, or from 30° to 75°, or from 30° to 70°, or from 30° to 65°, or from 35° to 77°, or from 35° to 75°, or from 35° to or from 35° to 65°.

In embodiments of the disclosure, the ethylene-vinylcyclohexane copolymer has an average melt strain hardening index (MSHI) of ≤1.70, or <1.70, or ≤1.50, or <1.50, or ≤1.25, or <1.25, or ≤1.20, or <1.20, or ≤1.15, or <1.15, or ≤1.10, or <1.10, or ≤1.00, or <1.00. In embodiments of the disclosure, the ethylene-vinylcyclohexane copolymer has an average melt strain hardening index (MSHI) of from 0.70 to 1.25, or from 0.75 to 1.25, or from 0.80 to 1.25, or from 0.80 to 1.20, or from 0.75 to 1.20, or from 0.75 to 1.15, or from to 1.10, or from 0.75 to 1.00, or from 0.85 to 1.20, or from 0.85 to 1.15, or from 0.85 to 1.10, or from 0.85 to 1.00, or from 0.80 to 1.15, or from 0.80 to 1.10, or from 0.80 to 1.00.

In an embodiment of the present disclosure, an ethylene-vinylcyclohexane copolymer described as above is itself used as a blending component in a polymer composition also comprising: i) an ethylene homopolymer component; and/or ii) an ethylene copolymer component which is different from the ethylene-vinylcyclohexane copolymer component.

In embodiments of the disclosure, the ethylene-vinylcyclohexane copolymers may contain additives. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof.

The ethylene-vinylcyclohexane copolymer disclosed herein may be converted into flexible manufactured articles such as monolayer or multilayer films. Such films are well known to those experienced in the art; non-limiting examples of processes to prepare such films include blown film and cast film processes.

In the blown film extrusion process an extruder heats, melts, mixes and conveys a thermoplastic, or a thermoplastic blend. Once molten, the thermoplastic is forced through an annular die to produce a thermoplastic tube. In the case of co-extrusion, multiple extruders are employed to produce a multilayer thermoplastic tube. The temperature of the extrusion process is primarily determined by the thermoplastic or thermoplastic blend being processed, for example the melting temperature or glass transition temperature of the thermoplastic and the desired viscosity of the melt. In the case of polyolefins, typical extrusion temperatures are from 330° F. to 550° F. (166° C. to 288° C.). Upon exit from the annular die, the thermoplastic tube is inflated with air, cooled, solidified and pulled through a pair of nip rollers. Due to air inflation, the tube increases in diameter forming a bubble of desired size. Due to the pulling action of the nip rollers the bubble is stretched in the machine direction. Thus, the bubble is stretched in two directions: the transverse direction (TD) where the inflating air increases the diameter of the bubble; and the machine direction (MD) where the nip rollers stretch the bubble. As a result, the physical properties of blown films are typically anisotropic, i.e. the physical properties differ in the MD and TD directions; for example, film tear strength and tensile properties typically differ in the MD and TD. In some prior art documents, the terms "cross direction" or "CD" is used; these terms are equivalent to the terms "transverse direction" or "TD" used in this disclosure. In the blown film process, air is also blown on the external bubble circumference to cool the thermoplastic as it exits the annular die. The final width of the film is determined by controlling the inflating air or the internal bubble pressure; in other words, increasing or decreasing bubble diameter. Film thickness is controlled primarily by increasing or decreasing the speed of the nip rollers to control the draw-down rate. After exiting the nip rollers, the bubble or tube is collapsed and may be slit in the machine direction thus creating sheeting. Each sheet may be wound into a roll of film. Each roll may be further slit to create film of the desired width. Each roll of film is further processed into a variety of consumer products as described below.

The cast film process is similar in that a single or multiple extruder(s) may be used; however the various thermoplastic materials are metered into a flat die and extruded into a monolayer or multilayer sheet, rather than a tube. In the cast film process the extruded sheet is solidified on a chill roll.

In the cast film process, films are extruded from a flat die onto a chilled roll or a nipped roll, optionally, with a vacuum box and/or air-knife. The cast films may be monolayer or coextruded multi-layer films obtained by various extrusion through a single or multiple dies. The resultant films may be the used as-is or may be laminated to other films or substrates, for example by thermal, adhesive lamination or direct extrusion onto a substrate. The resultant films and laminates may be subjected to other forming operations such as embossing, stretching, thermoforming. Surface treatments such as corona may be applied and the films may be printed.

In the cast film extrusion process, a thin film is extruded through a slit onto a chilled, highly polished turning roll, where it is quenched from one side. The speed of the roller controls the draw ratio and final film thickness. The film is then sent to a second roller for cooling on the other side. Finally, it passes through a system of rollers and is wound onto a roll.

In an embodiment, two or more thin films are coextruded through two or more slits onto a chilled, highly polished turning roll, the coextruded film is quenched from one side. The speed of the roller controls the draw ratio and final coextruded film thickness. The coextruded film is then sent to a second roller for cooling on the other side. Finally, it passes through a system of rollers and is wound onto a roll.

A cast film may further be laminated, one or more layers, into a multilayer structure.

Depending on the end-use application, the disclosed ethylene-vinylcyclohexane copolymer may be converted into films that span a wide range of thicknesses. Non-limiting examples include, food packaging films where thicknesses may range from about 0.5 mil (13 μm) to about 4 mil (102 μm), and; in heavy duty sack applications film thickness may range from about 2 mil (51 μm) to about 10 mil (254 μm).

The ethylene-vinylcyclohexane copolymer disclosed herein may be used in monolayer films; where the monolayer may contain more than one ethylene-vinylcyclohexane copolymer composition and/or additional thermoplastics; non-limiting examples of thermoplastics include polyethylene polymers and propylene polymers. The lower limit on the weight percent of the ethylene-vinylcyclohexane copolymer composition in a monolayer film may be about 3 wt %, in other cases about 10 wt % and in still other cases about 30 wt %. The upper limit on the weight percent of ethylene-vinylcyclohexane composition in the monolayer film may be 100 wt %, in other cases about 90 wt % and in still other cases about 70 wt %.

The ethylene-vinylcyclohexane copolymer disclosed herein may also be used in one or more layers of a multilayer film; non-limiting examples of multilayer films include three, five, seven, nine, eleven or more layers. The thickness of a specific layer (containing the ethylene-vinylcyclohexane copolymer composition) within a multilayer film may be about 5%, in other cases about 15% and in still other cases about 30% of the total multilayer film thickness. In other embodiments, the thickness of a specific layer (containing the ethylene-vinylcyclohexane copolymer composition) within a multilayer film may be about 95%, in other cases about 80% and in still other cases about 65% of the total multilayer film thickness. Each individual layer of a multilayer film may contain more than one ethylene-vinylcyclohexane copolymer composition and/or additional thermoplastics.

Additional embodiments include laminations and coatings, wherein mono or multilayer films containing the disclosed ethylene-vinylcyclohexane copolymer composition are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those experienced in the art. Frequently, adhesive lamination or extrusion lamination are used to bond dissimilar materials, non-limiting examples include the bonding of a paper web to a thermoplastic web, or the bonding of an aluminum foil containing web to a thermoplastic web, or the bonding of two thermoplastic webs that are chemically incompatible, e.g. the bonding of a ethylene-vinylcyclohexane copolymer composition containing web to a polyester or polyamide web. Prior to lamination, the web containing the disclosed ethylene-vinylcyclohexane copolymer composition(s) may be monolayer or multilayer. Prior to lamination the individual webs may be surface treated to improve the bonding, a non-limiting example of a surface treatment is corona treating. A primary web or film may be laminated on its upper surface, its lower surface, or both its upper and lower surfaces with a secondary web. A secondary web and a tertiary web could be laminated to the primary web; wherein the secondary and tertiary webs differ in chemical composition. As non-limiting examples, secondary or tertiary webs may include: polyamide, polyester and polypropylene, or webs containing barrier resin layers such as EVOH. Such webs may also contain a vapor deposited barrier layer; for example a thin silicon oxide ($SiO_x$) or aluminum oxide ($AlO_x$) layer. Multilayer webs (or films) may contain three, five, seven, nine, eleven or more layers.

The ethylene-vinylcyclohexane copolymer disclosed herein may be used in a wide range of manufactured articles comprising one or more films or film layers (monolayer or multilayer). Non-limiting examples of such manufactured articles include: food packaging films (fresh and frozen foods, liquids and granular foods), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction and biaxially oriented films and functional film layers in oriented polypropylene (OPP) films, e.g. sealant and/or toughness layers. Additional manufactured articles comprising one or more films containing at least one ethylene-vinylcyclohexane copolymer composition include laminates and/or multilayer films; sealants and tie layers in multilayer films and composites; laminations with paper; aluminum foil laminates or laminates containing vacuum deposited aluminum; polyamide laminates; polyester laminates; extrusion coated laminates; and hot-melt adhesive formulations. The manufactured articles summarized in this paragraph contain at least one film (monolayer or multilayer) comprising at least one embodiment of the disclosed ethylene-vinylcyclohexane copolymer composition.

Cast films and laminates made from ethylene-vinylcyclohexane copolymers of the present disclosure may be used in a variety of end-uses, such as for example, for food packaging (dry foods, fresh foods, frozen foods, liquids, processed foods, powders, granules), for packaging of detergents, toothpaste, towels, for labels and release liners. The cast films may also be used in unitization and industrial packaging, notably in stretch films. The cast films may also be suitable in hygiene and medical applications, for example in breathable and non-breathable films used in diapers, adult incontinence products, feminine hygiene products, ostomy bags. The ethylene-vinylcyclohexane copolymers of the present disclosure may also be useful in tapes and artificial turf applications.

The films used in the manufactured articles described in this section may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof.

In an embodiment of the disclosure, a film or film layer comprises the ethylene-vinylcyclohexane copolymer described herein.

In an embodiment of the disclosure, a film or film layer is a monolayer film and comprises the ethylene-vinylcyclohexane copolymer described herein.

In an embodiment a film or film layer is a blown film.

In an embodiment a film or film layer is a cast film.

In embodiments of the disclosure, a film or film layer has a thickness of from 0.5 to mil.

In embodiments of the disclosure, a film or film layer comprises the ethylene-vinylcyclohexane copolymer described herein and has a thickness of from 0.5 to 10 mil.

In an embodiment of the disclosure, a multilayer film structure comprises at least one layer comprising the ethylene-vinylcyclohexane copolymer described herein.

In embodiments of the disclosure, a multilayer film structure has a thickness of from 0.5 to 10 mil.

In an embodiment of the disclosure, a multilayer film structure comprises at least one layer comprising the ethylene-vinylcyclohexane copolymer described herein, and the multilayer film structure has a thickness of from 0.5 to 10 mil.

An embodiment of the disclosure is a multilayer coextruded blown film structure.

An embodiment of the disclosure is a multilayer coextruded blown film structure having a thickness of from 0.5 to 10 mil.

An embodiment of the disclosure is a multilayer coextruded blown film structure comprising a film layer comprising the ethylene-vinylcyclohexane copolymer described herein.

An embodiment of the disclosure is a multilayer coextruded blown film structure comprising a film layer comprising the ethylene-vinylcyclohexane copolymer described herein, and the multilayer film structure has a thickness of from 0.5 to 10 mil.

An embodiment of the disclosure is a multilayer coextruded cast film structure.

An embodiment of the disclosure is a multilayer coextruded cast film structure having a thickness of from 0.5 to 10 mil.

An embodiment of the disclosure is a multilayer coextruded cast film structure comprising a film layer comprising the ethylene-vinylcyclohexane copolymer described herein.

An embodiment of the disclosure is a multilayer coextruded cast film structure comprising a film layer comprising the ethylene-vinylcyclohexane copolymer described herein, and the multilayer film structure has a thickness of from 0.5 to 10 mil.

In embodiments of the disclosure, a film comprising ethylene-vinylcyclohexane copolymer will have an oxygen transmission rate (OTR, normalized to 1 mil thickness) of ≤700 $cm^3$ per 100 $inch^2$ per day, or ≤600 $cm^3$ per 100 $inch^2$ per day, or ≤500 $cm^3$ per 100 $inch^2$ per day, or ≤450 $cm^3$ per 100 $inch^2$ per day. In embodiments of the disclosure, a film comprising ethylene-vinylcyclohexane copolymer will have an oxygen transmission rate (OTR, normalized to 1 mil thickness) of from 150 to 700 $cm^3$ per 100 $inch^2$ per day, or from 150 to 600 $cm^3$ per 100 $inch^2$ per day, or from 200 to 700 $cm^3$ per 100 $inch^2$ per day, or from 200 to 600 $cm^3$ per 100 $inch^2$ per day, or from 150 to 500 $cm^3$ per 100 $inch^2$ per day, or from 200 to 500 $cm^3$ per 100 $inch^2$ per day.

In embodiments of the disclosure, a film comprising an ethylene-vinylcyclohexane copolymer will have a water vapour transmission rate (WVTR, normalized to 1 mil thickness) of ≤2.000 grams per 100 $inch^2$ per day, or ≤1.7500 grams per 100 $inch^2$ per day, or ≤1.500 grams per 100 $inch^2$ per day, or ≤1.250 grams per 100 $inch^2$ per day, or ≤1.000 grams per 100 $inch^2$ per day. In embodiments of the disclosure, a film comprising an ethylene-vinylcyclohexane copolymer will have a water vapour transmission rate (WVTR, normalized to 1 mil thickness) of from 0.250 to 2.000 grams per 100 $inch^2$ per day, or from to 1.750 grams per 100 $inch^2$ per day, or from 0.450 to 2.000 grams per 100 $inch^2$ per day, or from 0.450 to 1.750 grams per 100 $inch^2$ per day, or from 0.300 to 1.500 grams per 100 $inch^2$ per day, or from 0.300 to 1.250 grams per 100 $inch^2$ per day, or from 0.250 to 1.000 grams per 100 $inch^2$ per day, or from 0.500 to 1.250 grams per 100 $inch^2$ per day.

The ethylene-vinylcyclohexane copolymer disclosed herein may be converted into rigid manufactured articles. Non-limiting examples of rigid articles include: deli containers, margarine tubs, drink cups and produce trays; household and industrial containers, cups, bottles, pails, crates, tanks, drums, bumpers, lids, industrial bulk containers, industrial vessels, material handling containers, bottle cap liners, bottle caps, living hinge closures; toys, playground equipment, recreational equipment, boats, marine and safety equipment; wire and cable applications such as power cables, communication cables and conduits; flexible tubing and hoses; pipe applications including both pressure pipe and non-pressure pipe markets, e.g. natural gas distribution, water mains, interior plumbing, storm sewer, sanitary sewer, corrugated pipes and conduit; foamed articles manufactured from foamed sheet or bun foam; military packaging (equipment and ready meals); personal care packaging, diapers and sanitary products; cosmetic, pharmaceutical and medical packaging, and; truck bed liners, pallets and automotive dunnage. The rigid manufactured articles summarized in this paragraph contain one or more of the ethylene-vinylcyclohexane copolymers disclosed herein or a blend of at least one of the ethylene-vinylcyclohexane copolymers disclosed herein with at least one other thermoplastic.

Such rigid manufactured articles may be fabricated using the following non-limiting processes: injection molding, compression molding, blow molding, rotomolding, profile extrusion, pipe extrusion, sheet thermoforming and foaming processes employing chemical or physical blowing agents.

The rigid manufactured articles described in this section may optionally include, depending on its intended use, additives and adjuvants. Non-limiting examples of additives and adjuvants include, antioxidants, slip agents, processing aids, anti-static additives, colorants, dyes, filler materials, heat stabilizers, light stabilizers, light absorbers, lubricants, pigments, plasticizers, nucleating agents and combinations thereof.

In an embodiment of the disclosure, the ethylene-vinylcyclohexane copolymer disclosed herein is used in a thermoformable film.

Thermoforming is a process in which a thermoplastic film or sheet is heated to a temperature at which the film or sheet is pliable and then stretched over and into the opening of a single-sided mold. The film is held in place over the contours of the mold while it cools and solidifies into the corresponding mold shape. During thermoforming, the film may be clamped in place on the mold and heated using convective or radiant heat to soften the film. The film or sheet, which is held horizontally over a mold cavity is then pressed, stretched or pulled into the mold using air pressure (applied to the back side of the film to push it into the mold cavity) or mechanical force (in which a die physically forces the film into the mold cavity by direct contact) optionally together with vacuum pressure (applied between the mold cavity and the film to pull the film into the mold cavity). The softened film then takes up the shape of the mold and is held in place until it cools and solidifies. Excess material is trimmed away from the edges of the mold, and the part released from the mold.

Thermoforming is also a known packaging process in which a container (e.g. a tray) is formed from a plastic film in a mold by application of vacuum, air pressure or a plug under increased temperature. Foodstuff is placed in the container and air is drawn from the packaging prior to sealing it with another film which is separate from the film used to make the container or tray. In foodstuff packing applications then, a thermoforming process generally involves two packaging films: a top lid film which seals (optionally under vacuum) to a bottom film which is made into a container; and a bottom thermoformable film which is formed into a tray during the first step of the packaging process and wherein the food is placed prior to the sealing step.

It is known to persons skilled in the art that nylon polymers have good performance in multilayer film thermoforming applications. It is also known, that when used in blends with polyethylene, cyclic olefin copolymers (e.g. TOPAS® COC) enhance performance in film thermoforming applications. As these cyclic olefin copolymers have relatively high cost, it would be desirable to produce other polyethylene copolymers affording good performance in film thermoforming applications. Especially useful would be novel ethylene rich polyethylene copolymers (e.g. ethylene copolymers which contain less than about 30 wt % of comonomer) which could be used in the absence of nylons in all polyethylene film structures for enhanced recyclability.

Thermoforming can be applied to both rigid and flexible packaging. Somewhere in-between, semi-rigid packaging exists. Typical thermoforming temperatures for multilayer packaging films involving polyethylenes is from 85° C. to 110° C.

Techniques have been used to predict polymer thermoformability, and these methods are available to persons skilled in the art. For a semi-crystalline polymer, it is desirable that such a screening tool reflect the total contributions of both the melt state (as represented by the amorphous phase) and the solid state (as represented by the crystalline phase) of the polymer. Failure to recognize the contributions from both phases cannot reflect the true physical state of a specimen in a real thermoforming process involving semi-crystalline polymers. One such method to reflect the total contributions of both amorphous and crystalline phases in the whole sample for a semi-crystalline polymer is concerned with the dimensional uniformity of a film when the film is subjected to conditions which approximate those encountered in a thermoforming process. This proxy test method determines the so-called "area Dimensional Thermoformability Index" or the "aDTI" and serves as a useful tool to predict the expected performance of a given film in a thermoforming application (see for example, XiaoChuan Wang and Mini Boparai, *Annual Technical Conference of the Society of Plastics Engineers*, May 16-20, 2010, Orlando, Florida, USA). In the present disclosure, a modified version of this methodology is used to predict the thermoformability of an ethylene-vinylcyclohexane copolymer with respect to thickness distribution uniformity or tendency of corner thinning, and this method is described below in the Examples section. Use of the modified method allows a person skilled in the art to assess or rank the dimensional thermoformability of an ethylene-vinylcyclohexane copolymer against commercially available resins known to have good or bad thermoformability using typical thermoforming conditions for films comprising polyethylenes. The lower the area DTI, the better the dimensional thermoformability. A lower aDTI value suggests that the film of a polymer may have a higher thickness distribution uniformity or less tendency toward corner thinning during thermoforming compared to another polymer with a higher aDTI value under the same deformation conditions.

In an embodiment of the disclosure, a thermoformable film is a single layer film (i.e. a monolayer film).

In an embodiment of the disclosure, a thermoformable film is a multilayer film.

In embodiments of the disclosure, a thermoformable film or sheet or thermoformable film layer has a thickness of from 3 to 20 mils.

In embodiments of the disclosure, a thermoformable multilayer film or sheet structure has a thickness of from 3 to 20 mils.

In embodiments of the disclosure, a thermoformable film or sheet or thermoformable film layer comprises the ethylene-vinylcyclohexane copolymer described above.

In an embodiment of the disclosure, a thermoformable multilayer film or sheet structure comprises a film layer comprising the ethylene-vinylcyclohexane copolymer described above.

In embodiments of the disclosure, a thermoformable film or sheet or thermoformable film layer comprises the ethylene-vinylcyclohexane copolymer described above and has a thickness of from 3 to 20 mils.

In an embodiment of the disclosure, a thermoformable multilayer film or sheet structure comprises a film layer comprising the ethylene-vinylcyclohexane copolymer described above and the multilayer film or sheet structure has a thickness of from 3 to 20 mils.

In embodiments of the disclosure, the ethylene-vinylcyclohexane copolymer will have an area Dimensional Thermoformability Index ("aDTI") determined at 105° C., of less than 20, or less than 15, or less than 10, or less than 7, or less than 5, or ≤15, or ≤10, or ≤7, or ≤5, or ≤3.

In embodiments of the disclosure, the ethylene-vinylcyclohexane copolymer will have an area Dimensional Thermoformability Index ("aDTI") determined at 105° C., of from 0.5 to 20, or from 0.5 to 15, or from 0.5 to 10, or from 0.5 to 7, or from 0.5 to 5, or from 0.5 to 3, or from 1 to 7, or from 1 to 5, or from 1 to 3.

The films used in the manufactured articles described in this section may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

The following examples are presented for the purpose of illustrating selected embodiments of this disclosure; it being understood, that the examples presented do not limit the claims presented.

EXAMPLES

Ethylene was purchased from Praxair as polymer grade. The ethylene was purified and dried by passing the gas through a series of purification beds including alumina, 13X molecular sieves, and a conventional deoxygenation bed. The vinylcyclohexane was purchased from Norquay Technology (purity greater than 98.5%) and further purified by placing over activated 13X molecular sieves. Xylene was purchased from Univar. It was purified and dried by passing through a deoxygenation catalyst, alumina, and 3A and 13X molecular sieve beds). Cyclohexane was purchased from Univar. It was purified and dried by passing through a deoxygenation catalyst, alumina beds, and 3A and 13X molecular sieve beds. 13x molecular sieves were purchased from Grace Davison and stored in general lab storage. Before being used as a drying agent, the molecular sieves were heated for 16 hours at 360° C. to activate them and were then pumped into a glovebox at full dynamic vacuum for at least 3 hours. 3A molecular sieve pellets were activated in the same manner.

Triphenylmethylcarbenium tetrakis(pentafluorophenyl) borate (trityl borate) was purchased from Albemarle and used without further purification.

Diphenylmethylidene(cyclopentadienyl)(2,7-di-tert-butylfluoren-9-yl)hafnium dichloride) was purchased from Boulder Scientific. It was methylated to diphenylmethylidene(cyclopentadienyl)(2,7-di-tert-butylfluoren-9-yl)hafnium dimethide prior to use. Modified methylaluminoxane-7 (MMAO-7) was purchased as a 7 wt % solution in ISOPAR® E from Akzo Nobel Polymer Chemicals. It was contained in a pyrosafe cylinder and used as received in a glovebox. 2,6-di-tert-butyl-4-ethylphenol (BHEB) was purchased as a 99% pure compound and used without further purification. Tri(n-octyl) aluminum was purchased from Chemtura Greenwich with a concentration of 25% in hexane.

Prior to testing, each polymer specimen was conditioned for at least 24 hours at 23±2° C. and 50±10% relative humidity and subsequent testing was conducted at 23±2° C. and ±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

The densities of ethylene-vinylcyclohexane copolymers were determined using ASTM D792-13 (Nov. 1, 2013).

The melt indexes of ethylene-vinylcyclohexane copolymers were determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship: S.Ex.=log $(I_6/I_2)$/log(6480/2160) wherein $I_6$ and $I_2$ are the melt flow rates measured at 190° C. using 6.48 kg and 2.16 kg loads, respectively.

Conventional Size Exclusion Chromatography (SEC or GPC):

Ethylene-vinylcyclohexane copolymer samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Polymer solutions were chromatographed at 140° C. on a PL 220 high-temperature chromatography unit equipped with four SHODEX ° columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect GPC columns from oxidative degradation. The sample injection volume was 200 μL. The GPC columns were calibrated with narrow distribution polystyrene standards. The polystyrene molecular weights were converted to polyethylene molecular weights using the Mark-Houwink equation, as described in the ASTM standard test method D6474-12 (December 2012). The GPC raw data were processed with the CIRRUS ° GPC software, to produce molar mass averages ($M_n$, $M_w$, $M_z$) and molar mass distribution (e.g. Polydispersity, $M_w/M_n$). In the polyethylene art, a commonly used term that is equivalent to SEC is GPC, i.e. Gel Permeation Chromatography.

Size Exclusion Chromatography with Viscometry (GPC-Vis):

A polymer sample (3 to 8 mg) was weighed into the sample vial and loaded onto the auto-sampler of the CEF unit (purchased from Polymer Char). The vail was filled with 6 to 7 ml 1,2,4trichlorobenzene (TCB, containing 250 ppm antioxidant 2,6-di-tert-butyl-4-methylphenol (BHT)), heated to the desired dissolution temperature (e.g. 160° C.) with a shaking rate of level number 3 for 2 hours. The solution was then loaded into the CEF sample loop (0.5 ml) and chromatographed on a set of four PL Mixed A GPC columns (purchased from Agilent) sitting inside the top oven of the CEF unit, using TCB as the mobile phase with a flow rate of 1.0 mL/minute. The temperature of both main oven and top oven of the CEF instrument was set at 140° C. The SEC eluent was introduced to the IR4 flow cell and then to the differential viscometer (Four-Capillary Bridge Viscometer, Polymer Char). The data were acquired using the CIRRUS GPC Multi software, and processed using the CIRRUS GPC Multi software and Excel Spreadsheet to provide molecular weight averages and distributions. A polyethylene standard with a narrow molecular distribution, SRM1484a (purchased from National Institute of Standards & Technology), was used to determine the inter-detector delay. A NOVA Chemicals' commercial ethylene-octene copolymer resin, FPs117-C, was used to calibrate the Infrared detector (IR4) and the differential viscometer. There was a slight effect of vinylcyclohexane content on the IR4 detector response observed as compared with the ethylene-octene copolymer resin, the IR4 detector response was corrected with sample concentration when analyzing the ethylene-vinylcyclohexane copolymers since these copolymers made with a single site catalyst were assumed to have a uniform comonomer (i.e. vinylcyclohexane) distribution for the current composition range investigated.

NMR to Determine Comonomer Content and Methyl Branching Content:

NMR samples were prepared by swelling the polymer in a 10/90 mixture of ODCB-$d_4$/ODCB in 10 mm NMR tubes at 125° C. $^{13}C\{^1H\}$ NMR spectra were collected on a 700 MHz NMR spectrometer in 10 mm sample tubes at 125° C. An inverse gated decoupling scheme with a 90° pulse and 30 s interpulse delay was used. Spectra were collected until the PE backbone peak reached a signal/noise ratio of 20000:1; chemical shifts were referenced to the polymer backbone resonance, designated to be 30.0 ppm.

Vinylcyclohexane content and sparse aliphatic branching were calculated by comparing the integral of unique peaks or regions from that unit with the total $^{13}C$ integral and using the following formula:

$$\frac{\text{units}}{1000C} = \frac{\left(\frac{I_{peak}}{n}\right)}{I_{total}} \times 1000$$

where $I_{peak}$ is the integral of the unique peak from the unit; n is the number of equivalent carbons from the unit contributing to the peak; $I_{total}$ is the total integral across all $^{13}C$ peaks from the polymer sample. For Cl branches, the peak at 20.0 ppm was used. For vinylcyclohexane, an average of the peaks at 27.6, 31.8, 28.4, 41.8, and 44.0 ppm was used.

DMA (Dynamic Mechanical Analyses):

Dynamic mechanical analyses were carried out with a rheometer, namely Rheometrics Dynamic Spectrometer (RDS-II) or Rheometrics SR5 or ATS Stresstech, on compression molded samples under nitrogen atmosphere at 190° C., using 25 mm diameter cone and plate geometry. The oscillatory shear experiments were done within the linear viscoelastic range of strain (10% strain) at frequencies from 0.05 to 100 rad/s. The values of storage modulus (G'), loss modulus (G"), complex modulus (G*) and complex viscosity (1*) were obtained as a function of frequency. The phase angle can be calculated from the tested G' and G". The same rheological data can also be obtained by using a 25 mm diameter parallel plate geometry at 190° C. under nitrogen atmosphere.

Differential Scanning calorimetry (DSC):

Compression molded films (see description below) with a thickness of about 2 mils (about 0.0508 mm) were used to measure the crystallinity. Primary melting peak (° C.), heat of fusion (J/g) and polymer sample crystallinity (the "Xc" value in percent, %) was determined using differential scanning calorimetry (DSC) as follows: the instrument (TA Instruments Q2000) was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The DSC Tm, heat of fusion and crystallinity ("the Xc" or "Xc %") are reported from the $2^{nd}$ heating cycle.

Dynamic Mechanical Thermal Analysis (DMTA):

Dynamic mechanical thermal analysis (DMTA) was carried out using Rheometrics RDS2 rotational rheometer from −150° C. to +200° C., under the following conditions: a heating rate of 50 C/minute, strain amplitude of 1% and frequency of 1 Hz. The film fixture is used. The sample thickness was about 0.13 to 0.15 mm (5 to 6 mils). The glass transition temperature (Tg) is taken as the peak temperature from the temperature-loss modulus profile.

Vicat Softening Point (Temperature):

The Vicat softening point of a polymer was determined according to ASTM D1525-07 (published December 2009). This test determines the temperature at which a specified needle penetration occurs when samples are subjected to ASTM D1525-07 test conditions, i.e., heating Rate B (120±10° C./hr and 938 gram load (10±0.2N load).

The average Melt Strain Hardening Index (the "MSHI"):

The transient extensional rheology of resins was studied using a host rotational rheometer sold under the name Sentmanat Extensional Rheometer ("SER"). Rectangular samples with pre-measured dimensions were mounted between the fixing clamps and were heated up to the measurement temperature. The resulting torques M was then monitored upon stretching of the mounted sample as a function of time at a constant Hencky strain rate ($\dot{\varepsilon}_H$) ranging between 0.01-10 $s^{-1}$. The transient extensional viscosity $\eta_E^*(t)$ was calculated using the following equation:

$$\eta_E^*(t) = \frac{M(t)}{2R\dot{\varepsilon}_H A(T)\exp(-\dot{\varepsilon}_H t)}$$

in which R is the SER drum radius (5.155 mm) and A(T) is the corrected cross-sectional area of the sample as a function of temperature. The cross-sectional area of the sample at the testing temperature was estimated using the equation in below.

$$A(T) = A_0\left(\frac{\rho_s}{\rho_m(T)}\right)^{2/3}$$

in which $A_0$, $\rho_s$ and $\rho_m$ are the measured cross-sectional area in solid-state, the sample solid-state density and the melt-state density at temperature T. A parameter, the Melt Strain Hardening Index (MSHI) or $\eta_E^*/\eta_{Linear}^*$, is calculated as follows using the transient extensional viscosity data tested at 150° C. and 0.3-1 Henky strain rate:

a) The data from 1 to 4 seconds are fitted to obtain a linear equation of $\eta_{Linear}^*$ vs time ($\eta_{Linear}^*$=a+b*time). If the slope (b value) is less than 0, the average MSHI is defined as "<0.98".

b) The data starting from 4 seconds to the end point ($t_f$) where the data is still reliable are selected. Then the Melt Strain Hardening Index (MSHI)=$\eta_E^*/\eta_{Linear}^*$ for each experimental point is calculated, where $\eta_E^*$ is the tested extensional viscosity and $\eta_{Linear}^*$ is the calculated value using the above fitted equation, for each experimental point between 4 to $t_f$ seconds.

c) The average MSHI (time=4 to $t_f$ seconds) is then obtained by averaging the MSHI data from 4 to $t_f$ seconds.

An example of calculating the average melt strain hardening index (MSHI) is shown in FIG. 1.

Method of Making Compression Molded Film for OTR and WVTR Determination:

A laboratory scale compression molding press Wabash G304 from Wabash MPI was used to prepare compression molded film from the inventive and comparative resins. A metal frame of required dimensions and thickness was filled with a measured quantity of resin (e.g. pellets of a polyethylene homopolymer composition) and sandwiched between two polished metal plates. The measured polymer quantity used was sufficient to obtain the desired film thickness. Polyester sheets (MYLAR®) were used on top of the metal backing plates to prevent the sticking of the resin to the metal plates. This assembly with the resin was loaded in the compression press and preheated at 200° C. under a low pressure (e.g. 2 tons or 4400 lbs per square foot) for five minutes. The platens were closed and a high pressure (e.g., 28 tons or 61670 lbs per square foot) was applied for another five minutes. After that, the press was cooled to about 45° C. at a rate of about 15° C. per minute. On completion of the cycle, the frame assembly was taken out, disassembled and the film (or plaque) was separated from the frame. Subsequent tests were done after at least 48 hours after the time at which the compression molding was carried out.

Determination of the Oxygen Transmission Rate ("OTR") of a Compression Molded Film Using a Masking Method:

The oxygen transmission rate (OTR) of the compression-molded film was tested using an OX-TRAN® 2/20 instrument manufactured by MOCON Inc, Minneapolis, Minnesota, USA using a version of ASTM F1249-90. The instrument has two test cells (A and B) and each film sample was analyzed in duplicate. The OTR result reported is the average of the results from these two test cells (A and B). The test is carried out at a temperature of 23° C. and at a relative humidity of 0%. Typically, the film sample area used for OTR testing was 100 $cm^2$. However, for barrier testing of films where there is a limited amount of sample, an aluminum foil mask is used to reduce the testing area. When using the mask, the testing area is reduced to 5 $cm^2$. The foil mask had adhesive on one side to which the sample was attached. A second foil was then attached to the first to ensure a leak free seal. The carrier gas used was 2% hydrogen gas in a balance of nitrogen gas and the test gas was ultra high purity oxygen. The OTR of the compression molded films were tested at the corresponding film thickness as obtained from the compression molding process (in $cm^2$, per 100 $inch^2$, per 24 hours). However, in order to compare different samples, the resulting OTR values (in units of $cm^3$/100 $in^2$/day) have been normalized to a film thickness value of 1 mil.

Determination of the Water Vapor Transmission Rate ("WVTR") of a Compression Molded Film Using a Masking Method:

The water vapor transmission rate (WVTR) of the compression-molded film was tested using a PERMATRAN-W® 3/34 instrument manufactured by MOCON Inc, Minneapolis, Minnesota, USA using a version of ASTM D3985. The instrument has two test cells (A and B) and each film sample was analyzed in duplicate. The WVTR result reported is the average of the results from these two test cells (A and B). The test is carried out at a temperature of 37.8° C. and at a relative humidity of 100%. Typically, the film sample area used for WVTR testing was 50 $cm^2$. However, for barrier testing of films where there was a limited amount of sample, an aluminum foil mask was used to reduce the testing area. When using the mask, the testing area was reduced to 5 $cm^2$. The foil mask has adhesive on one side to which the sample was attached. A second foil was then attached to the first to ensure a leak free seal. The carrier gas used was ultra high purity nitrogen gas and the test gas is water vapor at 100% relative humidity. The WVTR of the compression molded films were tested at the corresponding film thickness as obtained from the compression molding process (in grams, per 100 $inch^2$, per 24 hours). However, in order to compare different samples, the resulting WVTR values (in units of grams/100 $in^2$/day) have been normalized to a film thickness value of 1 mil.

Ethylene-Vinylcyclohexane Copolymerization Process:

All the copolymerization examples were conducted on a continuous solution polymerization reactor. The process was continuous in all feed streams (solvent, monomers and catalyst) and in the removal of product. All feed streams were purified prior to the reactor by contact with various absorption media to remove catalyst killing impurities such as water, oxygen and polar materials as is known to those skilled in the art. All components were stored and manipulated under an atmosphere of purified nitrogen.

All the examples below were conducted in a reactor of 70 mL internal volume. In some experiments, the volumetric feed to the reactor was 27.0 mL/min. The catalyst solutions were pumped to the reactor independently. The copolymerizations were carried out in cyclohexane at a pressure of 1500 psi. Ethylene was supplied to the reactor by a calibrated thermal mass flow meter at the rate shown in Table 1. Vinylcyclohexane was diluted in the reaction solvent prior to being fed to the polymerization reactor. Under these conditions the monomer conversion (ethylene and vinylcyclohexane) is a dependent variable controlled by the catalyst concentration, reaction temperature and catalyst component ratios, etc. The internal reactor temperature is monitored by a thermocouple in the polymerization medium and can be controlled at the required set point to +/−0.5° C. Downstream of the reactor the pressure was reduced from the reaction pressure (1500 psi) to atmospheric.

The ethylene conversion was determined by a dedicated on-line gas chromatograph by reference to propane which was used as an internal standard. The average polymerization rate constant was calculated based on the reactor hold-up time, the catalyst concentration in the reactor and the ethylene conversion and is expressed in 1/(mmol*min). Polymerization activity Kp is defined as: (Kp)(HUT)=Q((1−Q)(1/catalyst concentration) where Q is the percent ethylene conversion; [M] is the catalyst (metal) concentration in the reactor expressed in mM; and HUT is the reactor hold-up time in minutes.

The following single site catalyst (SSC) components were used to carry out the copolymerization: diphenylmethylene (cyclopentadienyl)(2,7-di-t-butylfuorenyl)hafnium dimethide [$(2,7\text{-tBu}_2\text{Flu})Ph_2C(Cp)HfMe_2$]; methylaluminoxane (MMAO-07); trityl tetrakis(pentafluoro-phenyl)borate (trityl borate) and 2,6-di-tert-butyl-4-ethylphenol (BHEB). The catalyst was activated in situ (in the polymerization reactor) at the reaction temperature in the presence of the monomers.

The copolymerization reaction conditions are provided in Table 1, while the properties of the resulting ethylene-vinylcyclohexane copolymers and the barrier properties (OTR and WVTR) of pressed films (compression molded) made from the copolymers is given in Table 2.

TABLE 1

Copolymerization Conditions

| Example No. | Inventive 1 | Inventive 2 | Inventive 3 |
|---|---|---|---|
| Activator | B/MMAO/OH | B/MMAO/OH | B/MMAO/OH |
| Polymerization Temperature (° C.) | 132 | 126 | 160 |
| Ethylene (g/min) | 1.9 | 1.6 | 1.6 |
| Vinylcyclohexane: Ethylene Ratio (gram:gram) | 0.1907 | 0.3019 | 0.5031 |
| Ethylene Conversion (%) | 94.3 | 91.9 | 90.1 |
| Catalyst Concentration in the Reactor (micromol/L) | 1.85 | 1.48 | 0.71 |
| Kp (1/(mM · min)) | 3420 | 2958 | 4931 |
| Total Solution Flow (mL/min) | 27 | 27 | 27 |
| **Example No.** | **Inventive 4** | **Inventive 5** | **Inventive 6** |
| Activator | B/MMAO/OH | B/MMAO/OH | B/MMAO/OH |
| Polymerization Temperature (° C.) | 130 | 140 | 140 |
| Ethylene (g/min) | 1.6 | 1.6 | 2.2 |
| Vinylcyclohexane:ethylene ratio (gram:gram) | 0.4025 | 0.4025 | 0.2195 |
| Ethylene Conversion (%) | 89.7 | 95.0 | 99.3 |
| Catalyst Concentration in the Reactor (micromol/L) | 0.42 | 2.04 | 3.24 |
| Kp (1/(mM · min)) | 8201 | 3577 | 15750 |
| Total Solution Flow (mL/min) | 27 | 27 | 27 |

Note for Table 1:

MMAO stands for modified methyl aluminoxane; B = trityl borate; OH = 2,6-di-tert-butyl-4-ethylphenol (BHEB). Parameters that were kept constant for all the copolymerization runs are as follows: B:Hf = 1.2/1 (mol/mol); OH/Al Mole ratio = 0.3/1; Al to metal ratio = 80/1.

TABLE 2

Ethylene-Vinylcyclohexane Copolymer Properties

| Example No. | Inventive 1 | Inventive 2 | Inventive 3 |
|---|---|---|---|
| Density ($g/cm^3$) | 0.9244 | 0.9289 | 0.9242 |
| Melt Index $I_2$ (g/10 min) | | | 0.57 |
| $I_6$ | | | 2.63 |
| Stress Exponent | | | 1.39 |
| VICAT | | | 110.9 |
| NMR | | | |
| Comonomer ID | vinyl-cyclohexane | vinyl-cyclohexane | vinyl-cyclohexane |
| Comonomer branch Freq/1000 C or Units/1000 C | 3.63 | 6.65 | 7.08 |
| Co-monomer Content (mol %) | 0.74 | 1.39 | 1.48 |
| Co-monomer Content (wt %) | 2.86 | 5.24 | 5.58 |
| C1 (i.e. methyl group) Branch Freq/1000 C | 0.84 | 0.65 | 1.3 |
| GPC - Conventional | | | |
| $M_n$ | 80710 | 85459 | 50677 |
| $M_w$ | 151589 | 165876 | 98323 |

TABLE 2-continued

| Ethylene-Vinylcyclohexane Copolymer Properties | | | |
|---|---|---|---|
| $M_z$ | 285960 | 297597 | 153087 |
| Polydispersity Index ($M_w/M_n$) | 1.88 | 1.94 | 1.94 |
| GPC - Visc | | | |
| $M_n$ | 83205 | 96300 | 61300 |
| $M_w$ | 208816 | 227000 | 137000 |
| $M_z$ | 427000 | 426000 | 247000 |
| Polydispersity Index ($M_w/M_n$) | 2.51 | 2.36 | 2.23 |
| DSC | | | |
| Primary Melting Peak (° C.) | 117.88 | 113.66 | 113.25 |
| Heat of Fusion (J/g) | 135.8 | 122.8 | 130.2 |
| Crystallinity (%), Xc | 46.81 | 42.36 | 44.91 |
| DMTA | | | |
| Tg (DMTA, Loss Modulus, beta transition) | −23 (very broad) | −47 to −16 (very broad) | −60 |
| Gas/Moisture Permeability of Compression Molded Film | | | |
| WVTR - film thickness (mil) | 3.5 | 4.6 | 3 |
| WVTR g/100 $IN^2$/Day (relative humidity = 100%, at 37.8° C., atm pressure) | 0.255 | 0.1468 | 0.3305 |
| WVTR in g/100 $IN^2$/Day - normalized thickness (1 mil) | 0.8925 | 0.6753 | 0.9915 |
| WVTR in g/$m^2$/Day - normalized thickness (1 mil) | 13.83 | 10.47 | 15.37 |
| OTR - film thickness (mil) | 3.5 | 4.6 | 3 |
| OTR in $cm^3$/100 $IN^2$/Day (relative humidity = 0%, at 23° C., atm pressure) | 114.1 | 88.23 | 143.9 |
| OTR in $cm^3$/100 $IN^2$/Day - normalized thickness (1 mil) | 399.35 | 405.86 | 431.70 |
| OTR in $cm^3$/$m^2$/Day - normalized thickness (1 mil) | 6189.91 | 6290.79 | 6691.34 |
| Example No. | Inventive 4 | Inventive 5 | Inventive 6 |
| Density (g/$cm^3$) | | | |
| Melt Index $I_2$ (g/10 min) | | | |
| $I_6$ | | | |
| Stress Exponent | | | |
| VICAT | | | |
| NMR | | | |
| Comonomer ID | vinyl-cyclohexane | vinyl-cyclohexane | vinyl-cyclohexane |
| Comonomer branch Freq/1000 C or Units/1000 C | 7.74 | 8.98 | 9.1 |
| Co-monomer Content (mol %) | 1.62 | 1.9 | 1.82 |
| Co-monomer Content (wt %) | 6.1 | 7.07 | 6.8 |
| C1 (i.e. methyl group) Branch Freq/1000 C | 0.6 | 1 | 2 |
| GPC - Conventional | | | |
| $M_n$ | 120378 | 67163 | 20059 |
| $M_w$ | 212987 | 127098 | 40587 |
| $M_z$ | 359149 | 204909 | 66210 |
| Polydispersity Index ($M_w/M_n$) | 1.77 | 1.89 | 2.02 |
| GPC - Visc | | | |
| $M_n$ | 132000 | 66229 | 28937 |
| $M_w$ | 324000 | 185087 | 124972 |
| $M_z$ | 627000 | 349000 | 1070000 |
| Polydispersity Index ($M_w/M_n$) | 2.45 | 2.80 | 4.32 |
| DSC | | | |
| Primary Melting Peak (° C.) | 111.55 | 107.1 | 113.87 |
| Secondary Melting Peak (° C.) | | 116.53 | 117.4 |
| Tertiary Melting Peak (° C.) | | 119.9 | |
| Heat of Fusion (J/g) | 120.7 | 123.91 | 143.1 |
| Crystallinity (%), Xc | 41.62 | 42.73 | 49.36 |
| DMTA | | | |
| Tg (DMTA, Loss Modulus, beta transition) | −41 to −16 (very broad) | | −16 |

TABLE 2-continued

| Ethylene-Vinylcyclohexane Copolymer Properties | | | |
|---|---|---|---|
| Gas/Moisture Permeability of Compression Molded Film | | | |
| WVTR - film thickness (mil) | 3.3 | 2.9 | 2.9 |
| WVTR g/100 $IN^2$/Day (relative humidity = 100%, at 37.8° C., atm pressure) | 0.2613 | 0.2827 | 0.2687 |
| WVTR in g/100 $IN^2$/Day - normalized thickness (1 mil) | 0.8623 | 0.8198 | 0.7792 |
| WVTR in g/$m^2$/Day - normalized thickness (1 mil) | 13.37 | 12.71 | 12.08 |
| OTR - film thickness (mil) | 3.3 | 2.9 | 2.9 |
| OTR in $cm^3$/100 $IN^2$/Day (relative humidity = 0%, at 23° C., atm pressure) | 121.62 | 111.65 | 81.93 |
| OTR in $cm^3$/100 $IN^2$/Day - normalized thickness (1 mil) | 401.35 | 323.79 | 237.60 |
| OTR in $cm^3$/$m^2$/Day - normalized thickness (1 mil) | 6220.85 | 5018.66 | 3682.75 |

The data in Table 2, show that each of the ethylene-vinylcyclohexane copolymers made according to the present disclosure have small amounts of vinylcyclohexane present and that as a result they have a relatively high degree of crystallinity, $X_c$ as determined by DSC. Inventive Examples 1-6 have a vinylcyclohexane content ranging from about 0.7 mol percent to about 1.9 mol percent, with Xc values which range from a low of about 41.6 percent to a high of about 49.4 percent.

Figure 2:
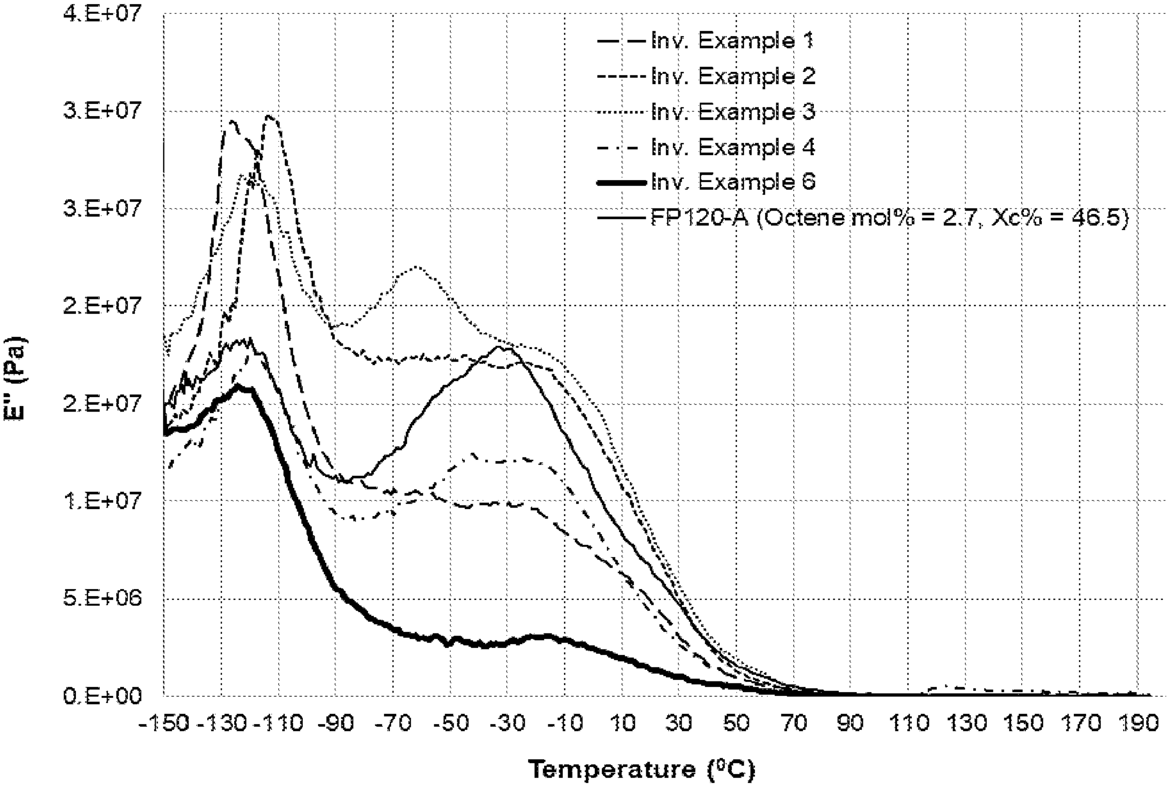
FIG. 2 shows a plot of the loss modulus E" (in Pa) vs. temperature for ethylene-vinylcyclohexane copolymers made according to the present disclosure. The higher temperature peaks occurring between about −50° C. and 10° C. correspond to a glass transition temperature (Tg) for the copolymer materials.

FIG. 2 shows a plot of the loss modulus E" (in Pa) vs. temperature (from DMTA) for ethylene-vinylcyclohexane copolymers made according to the present disclosure and having relatively high crystallinity (Xc is greater than 38% and ranges from 41.3 to 46.8). FIG. 2 also shows a plot of the loss modulus E" (in Pa) vs. temperature (from DMTA) for an ethylene/1-octene copolymer having similar crystallinity (Xc is 46.5%). In FIG. 2, the higher temperature peaks occurring between about −70° C. and about 5° C. correspond to a glass transition temperature (Tg) for the Inventive copolymer materials of Inventive Examples 1~4 and 6. In FIG. 2, the higher temperature peaks corresponding to a glass transition temperature (Tg) for the comparative ethylene/1-octene copolymer ("FP120-A", an ethylene/1-octene copolymer having a density of about 0.920 g/$cm^3$ and an melt index, 12 of about 1.0 g/10 min, commercially available from NOVA Chemicals) occurs between at around −30° C. Clearly then, the glass transition temperatures (Tg) of the ethylene-vinylcyclohexane copolymers made according to the present disclosure is similar to or lower than the glass transition temperatures (Tg) of a comparative ethylene/1-octene copolymer having similar crystallinity.

A van Gurp-Palmen analysis is a means by which to study a polymer architecture (e.g. molecular weight distribution, linearity, etc.) as reflected by the polymer melt rheology. A VGP curve is simply a plot of the phase angle (δ) versus complex modulus (G*), where the two rheology parameters are obtained using the frequency sweep test in dynamic mechanical analysis (DMA). A shift of a VGP curve from a baseline curve or a decrease in the phase angles around the mid-range of complex modulus (e.g. at a G* of around 10,000 Pa) suggests changes in the polymer melt rheology and may be used as an indicator of the presence of long chain branching. Without wishing to be bound by theory the value of the phase angle (δ) at a complex modulus (G*) of 10,000 Pa, is indicative of the presence of long chain branching in the copolymer material.

Figure 3:
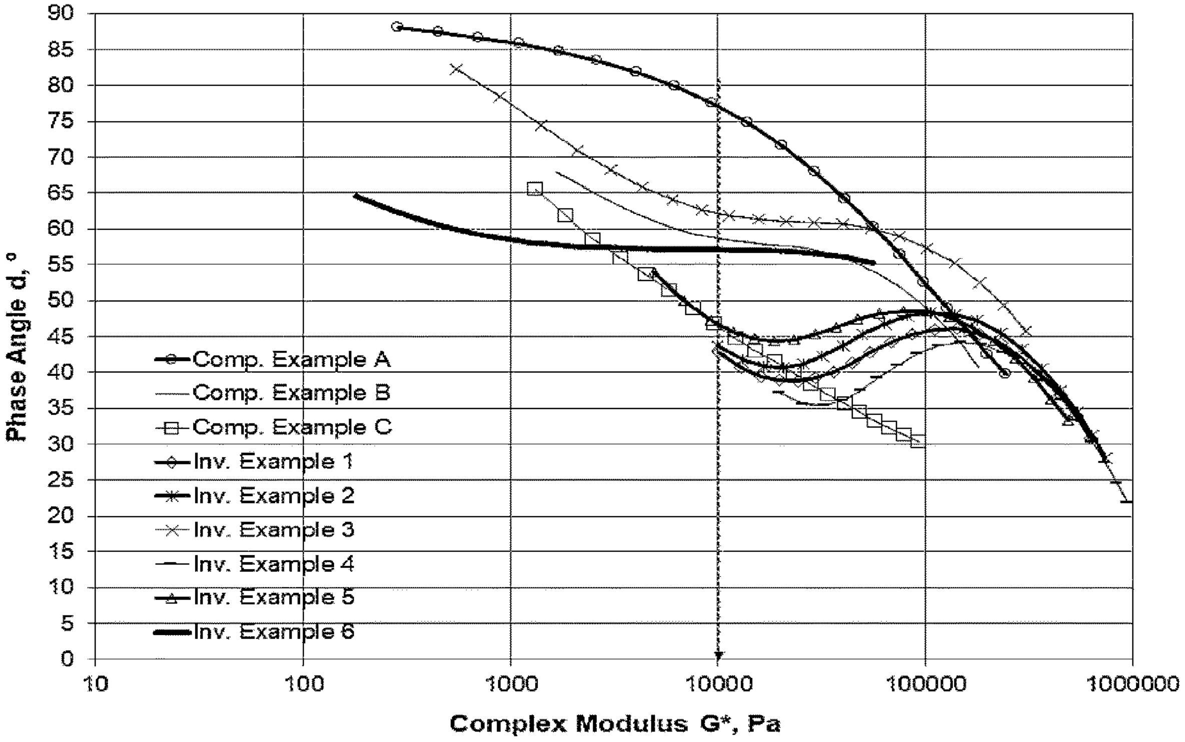
FIG. 3 shows a plot of the phase angle (δ) vs. the complex modulus (G*) for ethylene-vinylcyclohexane copolymers made according to the present disclosure. The value of the phase angle (δ) at a complex modulus (G*) of 10,000 Pa, is indicative of the presence of long chain branching in the copolymer material.

FIG. 3 shows a plot of the phase angle (δ) vs. the complex modulus (G*) for ethylene-vinylcyclohexane copolymers made according to the present disclosure (Inventive Examples 1-6). FIG. 3 also shows the corresponding data for some comparative polymer materials. Comparative Example A is SURPASS® FPs016-C, a resin commercially available from NOVA Chemicals. SURPASS® FPs016-C is a copolymer of ethylene and 1-octene and the copolymer has no long chain branches. Comparative Example B is ENABLE ° 20-05HH, a resin commercially available from ExxonMobil. ENABLE ° 20-05HH is a linear low density polyethylene (a copolymer of ethylene and 1-hexene) believed to contain long chain branching. A long chain branch is macromolecular in nature and may for example by similar in length to the macromolecule that the long chain branch is attached to. Comparative Example C is NOVAPOL® LF-Y320-A. NOVAPOL® LF-Y320-A is a low density polyethylene (a "LDPE") which is made under high pressure gas phase conditions and is known to contain significant amounts of long chain branching.

As can be seen from the curves in FIG. 3, Comparative Example A, which is a linear polymer having no long chain branching has a curve with no inflexion point and a phase angle (δ) at a complex modulus (G*) of 10,000 Pa of 77.1°. In contrast, Comparative Example B, which is believed to be a substantially linear polymer having long chain branching, has a curve exhibiting an inflection point and a phase angle (δ) at a complex modulus (G*) of 10,000 Pa of 58.8° and Comparative Example C, which is a low density polyethylene having significant amounts of long chain branching, has an even lower phase angle (δ) at a complex modulus (G*) of 10,000 Pa of 46.4°.

When examining the curves in FIG. 3 for Inventive Examples 1-6, a person skilled in the art will recognize that they are consistent with the presence of some degree of long chain branching. The curves for the Inventive Examples 1-6 have an inflection point and they all have a phase angle (δ) at a complex modulus (G*) of 10,000 Pa of less than 70°, which represents a downward deflection of the curve from that observed for the linear polymer, Comparative Example A. Indeed, some of the Inventive Examples even have a phase angle (δ) at a complex modulus (G*) of 10,000 Pa which is smaller than that observed for Comparative Example B. Although the currently tested data of Inventive Example 4 has not quite reached a complex modulus (G*) of 10,000 Pa, from the trend evident in FIG. 3, it is believed that the phase angle (δ) at G*=10,000 Pa for this ethylene-vinylcyclohexane copolymers will be well below 70°, or even 55°, if the testing frequency were to be expanded.

In a plot of the transient extension viscosity ($\eta_E$*(t) in Pa·s) vs time (seconds) for an ethylene polymer which is known to contain long chain branching, the average MSHI (as defined above; at time=4 to $t_f$ seconds at 0.3 $s^{-1}$ strain rate) is believed to be related to the length and amount of long chain branches (See FIG. 1 and the examples in Table 4 below). Without wishing to be bound by theory, the larger the value for the average MSHI, the longer the length and amount of the long chain branches present.

Table 3 shows the average melt strain hardening index (MSHI) for ethylene-vinylcyclohexane copolymers made according to the disclosure (Inventive Examples 3, 5 and 7) as well as for some comparative polyethylene resins. Comparative resin D is Eastman 808P, a low density polyethylene (LDPE). Comparative resin E is ExxonMobil LD201.48, a low density polyethylene (LDPE). Comparative resin F is DuPont LDPE 1640, a low density polyethylene (LDPE). Comparative resin G is NOVAPOL® LC-0522, a low density polyethylene (LDPE). Low density polyethylene (LDPE) which is made under high pressure gas phase conditions is well known to have relatively large amount of long chain branches and the lengths of some of the long chain branches is believed similar to that of the polymer backbone.

TABLE 3

The Average Melt Strain Hardening Index (MSHI) of the Ethylene-Vinylcyclohexane Copolymers and Comparative Resins

| Example No. | Test Temperature of Extensional Viscosity (degree ° C.) | Average Melt Strain Hardening Index (time from 4 to $t_f$ seconds at 0.3 $s^{-1}$ strain rate) | Slope of Fitting (1 to 4 seconds, 0.3 $s^{-1}$) |
|---|---|---|---|
| Comp. D | 150 | 1.69 | 3092.5 |
| Comp. E | 150 | 1.65 | 5918 |
| Comp. F | 150 | 1.34 | 6518 |
| Comp. G | 150 | 1.28 | 6501 |
| Inv. 1 | 150 | 0.90 | 105905 |
| Inv. 2 | 150 | 0.93 | 125205 |
| Inv. 3 | 150 | 0.97 | 13878 |
| Inv. 4 | 150 | 0.91 | 222777 |

It can be seen in the Table 4 that each of Comparative Examples D, E, F and G exhibit MSHI values which are higher than 1.0. The MSHI values of the ethylene-vinylcyclohexane copolymer of Inventive Examples 1-4 are all less than 1.0, which is less than that observed from Comparative Examples D, E, F and G. Hence, although the ethylene-vinylcyclohexane copolymers of the present disclosure have been shown to contain long chain branching (see FIG. 3 and the phase angle (δ) vs complex modulus (G*) data discussed above) the long chain branches, at least for Inventive Examples 1-4, are believed to be shorter long chain branches than those present in conventional LDPE polymers.

Without wishing to be bound by theory, it is believed that some degree of long chain branching may enhance the thermoformability of a polyethylene composition. During the thermoforming process, a sample exists in two phases for a semi-crystalline resin: an amorphous phase that can melt or soften well below the resin melting point and a solid phase that can remain in such a state until the resin melting point is reached. It is believed that a certain amount of long chain branching can increase the melt strength of the amorphous phase, helping the amorphous phase to maintain its integrity under the deformation stresses encountered during the thermoforming process. Meanwhile, it is believed that the mechanical strength of the solid phase is also an important consideration when the solid phase is subjected to the deformation stresses of a thermoforming process. Without wishing to be bound by theory, it is believed that if the content of the long chain branching and/or the length of the long chain branches within of a polyethylene composition is too large or too long, the long chain branching may negatively affect the mechanical strength of the solid phase of a semi-crystalline resin, leading to poorer performance of a resin in a thermoforming application. Hence, it is possible that that intermediate levels of long chain branching and/or long chain branching length observed for the polyethylene compositions of Inv. Examples 1-4 (See Table 4 and FIG. 3), relative to a LDPE, are useful for thermoforming applications.

Compression Molded Monolayer Film Samples for Determination of Area Dimensional Thermoformability Index A laboratory scale compression molding press, Wabash G304, from Wabash MPI was used to prepare compression molded films from the ethylene-vinylcyclohexane copolymers of Inventive Examples 1-5 as well as from other polymeric materials.

A Nylon-6 polymer (one of the polymers used to build the screening tool) was ground using a Thomas Wiley mill, into granular form, and then dried in a vacuum oven at under 20 mmHg of vacuum for 4 hours. Next, the nylon sample was removed from the oven and placed in a desiccator, which was sealed by applying a vacuum to the desiccator. The nylon sample was cooled for at least 1 hour in the desiccator before it was compression molded.

A metal shim was used as a mold. It was a brass shim (10 inch×10 inch), in which was carefully cut out four windows of 4 inch×4 inch to serve as the mold to be used. The thickness of the shim was about 0.018 to 0.019 inch which led to a final film thickness of approximately 0.015 inch or 15 mil. The mold was filled with a measured quantity of resin (e.g. pellets of a polyethylene composition or a nylon granular sample) and sandwiched between two polished metal plates. The measured polymer quantity used was sufficient to obtain the desired film thickness of 15 mils or 0.381 mm. For the polyolefin resins, polyester sheets (MYLAR) were used on top of the metal backing plates to prevent the resin from sticking to the metal plates. For the nylon 6 resin, TEFLON® sheets were used to prevent sticking.

The metal shim assembly with the resin sample was loaded into the compression molding press and preheated to 200° C. in the case of polyethylene materials and polyethylene-cyclic olefin copolymer blend materials, each in the absence of applied pressure and for 4 minutes. In the case of nylon 6, the sample was loaded into the compression molding press and preheated to 260° C. in the absence of an applied pressure for four minutes. To compression mold the sample the following sequence was carried out: a) the pressure was increased to 1 ton of pressure and the pressure was maintained at 1 ton for 1 minute; b) the pressure was then increased to 2 tons of pressure, and the pressure was maintained at 2 tons for 1 minute; c) the pressure was then increased to 3 tons of pressure, and the pressure was maintained at 3 tons for 1 minute; d) the pressure was then decreased to 1 ton, and the pressure was maintained at 1 ton of pressure for 1 minute; e) next the pressure was increased to 5 tons and the pressure was maintained at 5 tons for 2 minutes; f) the pressure was then increased to 28 tons, and the pressure was maintained at 28 tons for 3 minutes; g) finally, the compression molding press was cooled to about 45° C. at a rate of about 15° C. per minute, and then the pressure was released. On completion of the forgoing compression molding cycle, the metal shim assembly was taken out of the compression molding press to provide a compression molded film (or plaque). In the case of Nylon-6, the compression molded film was stored in a desiccator until cut into a specified shape (see below).

Figure 5:
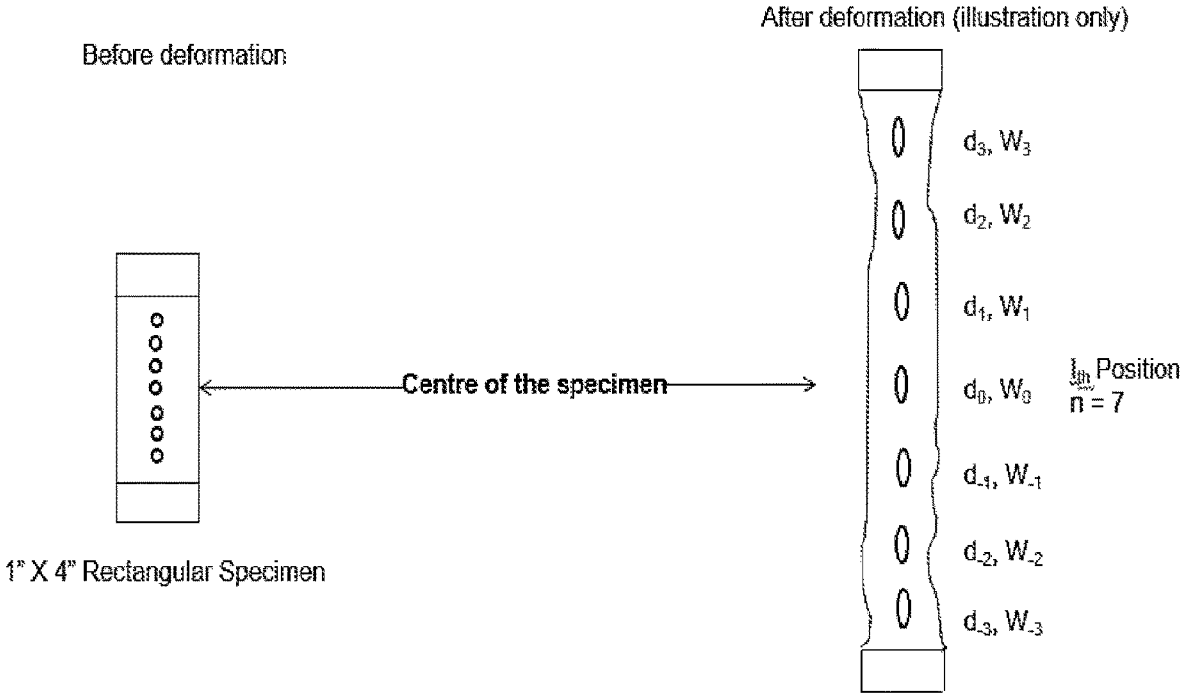
FIG. 5 illustrates the shape and dimensions of a test specimen before and after subjecting the specimen to high temperature tensile experiments.

A punch die was used on the compression molded films made as described above, to "punch" out a rectangular specimen (4 inches in length x 1 inch in width) having specific dimensions, see FIG. 5, and suitable for use in high temperature tensile experiments (see below). Again, the nylon-6 film specimens were placed in a desiccator prior to testing. Each sample was conditioned at room temperature and pressure for a least 48 hours, following compression molding and prior to high temperature tensile experiments.

Area Dimensional Thermoformability Index (aDTI)

Figure 4:
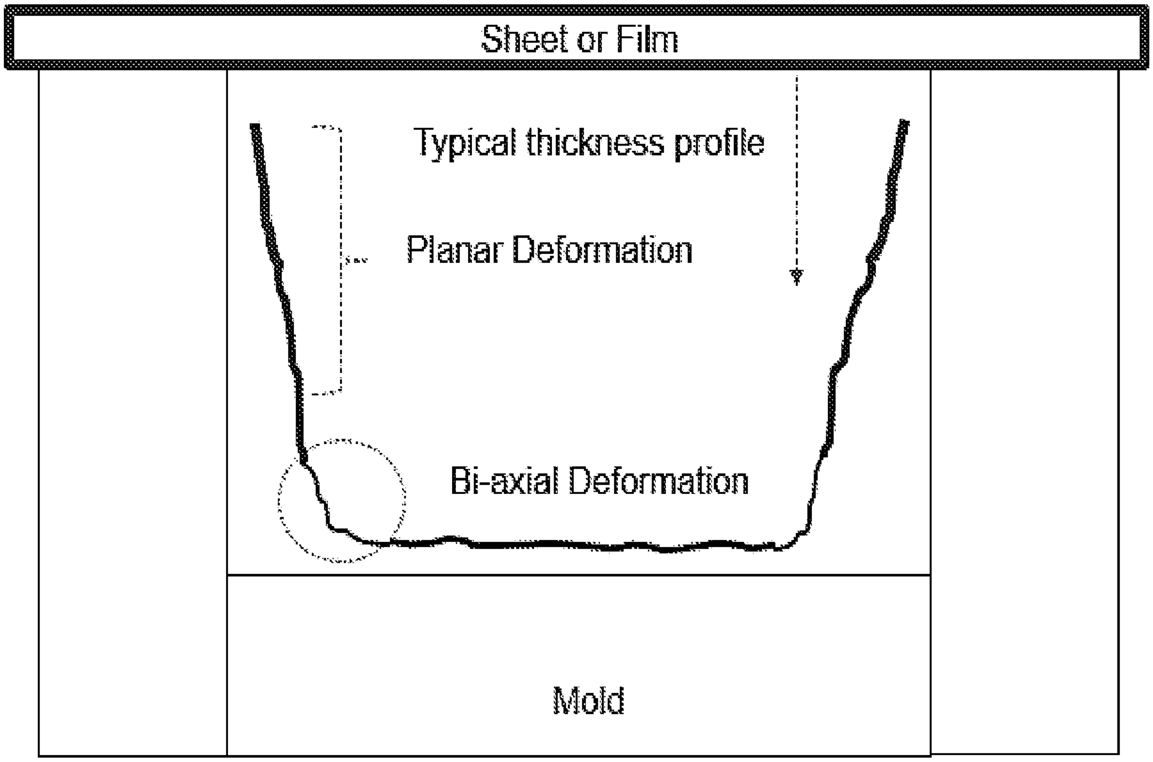
FIG. 4 shows a diagram illustrating the planar deformation and the biaxial deformation which occur when a plastic sheet or film is subjected to thermoforming in a mold.

A diagram depicting the general thermoforming process and deformations which occur is shown in FIG. 4. The diagram illustrates the planar deformation and the biaxial deformation which occurs when a plastic sheet or film is subjected to thermoforming in a mold.

The presently presented method, which determines the so called "area-Dimensional Thermoformability Index" (aDTI) was developed to approximate the deformations which occur during thermoforming and so serves as a laboratory scale proxy test method to assess the relative thermoformability of various resins with respect to thickness distribution uniformity or tendency of corner thinning. The proxy test employed to determine the aDTI is essentially a high temperature tensile experiment carried out on a test specimen having specific dimensions. An Instron 5965 Universal Testing Machine equipped with an oven chamber was used to carry out the tensile test. The test specimen used was a 15-mil thickness compression molded monolayer film having a length of 4 inches and width of 1 inch and prepared as described above. Once the test specimen was prepared it was marked with an ink dot at specific intervals along the mid-point of the sample's width, and along the length of the test specimen (See FIG. 7). The first position was 0.79375 cm (or 5/16") from the middle position (i.e., the position which is 2 inches from both edges of the 4-inch long specimen). The second position was 0.79375 cm (or 5/16") away from the above first position, and the third position was 0.79375 cm (or 5/16") away from the above second position. Symmetrically, the other three positions, relative to the middle position, can be identified in the opposite direction on the 4-inch long test specimen. Hence, a total of seven positions were identified and the data collected for these seven positions were used for the aDTI calculation. The upper and lower gripping positions are at 1.905 cm from the top and bottom edges of the 4-inch long specimen. A person skilled in the art will recognize that a different number of symmetrically marked positions could be devised in order to change the number of data points employed for the testing (in this case, the distance between two adjacent positions would need to be adjusted accordingly). The test specimen was then mounted in the oven chamber of the Instron instrument. The pulling speed of the machine was 20 in/min (8.47 mm/sec) using a 1-kN load cell with 2.5" grip separation. The specimen was pulled up to a 300% elongation and the test was stopped even though the specimen might have the potential for higher elongation than 300% at the test temperature. The upper limit of a 300% elongation was due to the limitation imposed by the internal height of the oven chamber. Each specimen was mounted and conditioned inside the chamber for 3 minutes at the desired temperature (e.g., 105° C.) prior to the pulling test at that temperature. Five specimens were generally used in the testing procedure to determine the aDTI value for a given polymer. Typically, the thermoforming temperature for a multilayer film containing a polyethylene copolymer lies somewhere in the range of from to 110° C. (and rarely reaches up to 120° C.). Accordingly, the temperatures of 95° C., 100° C. and 105° C. were used to screen various polymers during the development of the aDTI test method. However, once it became clear that the present method of determining the aDTI worked better to distinguish resins in experiments performed at 105° C., this temperature was used for further testing. A figure illustrating the test specimen before and after the tensile test was carried out is shown in FIG. 5.

Parameters such as the thickness Dimensional Thermoformability Index ("dDTI"), the width Dimensional Thermoformability Index ("wDTI"), and the area-Dimensional Thermoformability Index ("aDTI") were calculated from the pre-deformation (represented by the dimensions at room temperature prior to the high temperature tensile test) and post-deformation dimensions of the test specimen. It was found that aDTI worked better than dDTI and wDTI (although not all of this data are included here). The aDTI is calculated in the following way. Note that for the present disclosure, and the calculations provided below, seven locations were marked at the width's mid-point along the length of the test specimen, so that n=7, but a person a skilled in the art would know that the number of locations included could be varied, i.e. that n=x points. Several test specimens were also used, usually five, so that m=5, but a person a skilled in the art would know that the number of test specimens included could be varied, i.e. that m=y specimens. The final aDTI value then, determined as shown in the calculation below, encompasses the sum of all the specimens and positions and reflects the overall change in cross-sectional area between an original unstretched state to final stretched state over each id, location (n) over each $j_{th}$ specimen (m).

Area DTI Calculation:

For the $i_{th}$ position (i=1 to n) on each specimen and the j th specimen (j=1 to m); where j is the number of specimens tested and i is the number locations for which the cross-sectional area was determined on each specimen (as marked by an ink dot):

Step 1: For each specimen, a value $X_j$ (j=1 to m) is calculated as follows. This is to estimate the average change of the cross-sectional area prior to and after the tensile test for each specimen:

$$X_j = \text{Sum}[(A_{ij} - A_{ij}^0)/n = \text{Sum}[(d_{ij} \times W_{ij} - d_{ij}^0 \times W_{ij}^0)/(d_{ij}^0 \times W_{ij}^0)]/n$$

$$\text{where, } A_{ij}^0 = d_{ij}^0 \times W_{ij}^0$$

$$A_{ij} = d_{ij} \times W_{ij}$$

and where n is the number of the positions on each specimen where the dimensions (thickness and width) were measured prior to and after the tensile test;

$$d_{ij}^0$$

is the initial specimen thickness at the $i_{th}$ position of the $j_{th}$ specimen prior to the tensile test;

$$W_{ij}^0$$

is the initial specimen width at the $i_{th}$ position of the $j_{th}$ specimen prior to the tensile test; $d_{ij}$ is the specimen thickness at the $i_{th}$ position of the $j_{th}$ specimen after the tensile test; $W_{ij}$ is the specimen width at the $i_{th}$ position of the $j_{th}$ specimen after tensile the test;

$$A_{ij}^{0}$$

is the initial cross-sectional area prior to the tensile test at the $i_{th}$ position of the $j_{th}$ specimen; and is the cross-sectional area at the $i_{th}$ position of the $j_{th}$ specimen after the tensile test;

Step 2: For the area DTI of the $j_{th}$ specimen:

$$\text{Area } DTI_j = 100 * \text{Sum}\{\text{ABS}[X_j - (A_{ij} - A_{ij}^{0})/A_{ij}^{0})]\}/n$$

where the absolute value is taken to ensure that the value of aDTI is positive, and where for convenience, the area DTI J is reported as a multiple of 100;

Step 3: Average area DTI from all the specimens and all the positions tested for a sample:

$$\text{Area } DTI = \text{Sum (Area } DTI_j)/m$$

Note: Similar calculations may be completed to determine thickness Dimensional Thermoformability Index ("dDTI") if considering only the thickness dimension, and the width Dimensional Thermoformability Index ("wDTI") if considering only the width dimension.

Without wishing to be bound by theory, a smaller measured aDTI value, should correspond to a smaller change in the dimensions (e.g., the thickness at the corners of a film after thermoforming) of a film or sheet subjected to deformation stresses during thermoforming. Hence, a smaller aDTI value should correspond to an improved thermoformability with regard to a film's thickness distribution uniformity or its tendency to thin or lose corner thickness during a thermoforming process.

The aDTI method was validated by determining the aDTI values for polymers having known good or poor thermoformability under traditional thermoforming temperatures and conditions. For example, nylon polymers are known to be much better than traditional polyolefins in the thermoformability of multilayer films, including for example the reduction of corner thinning. Also known to persons skilled in the art, is that TOPAS 8007 (a cyclic olefin copolymer) may be used to improve the thermoformability of traditional polyethylenes in thermoforming applications. Accordingly, and as known to persons skilled in the art, TOPAS 8007 has been used as a component in a polymer blend with a traditional polyethylene to enhance the thermoformability of multilayer films. Conversely, HPs167-AB is a nonpolar polyethylene resin with a high melting point and high crystallinity, properties which are thought to be detrimental to the thermoformability of a nonpolar polymer.

Figure 6:
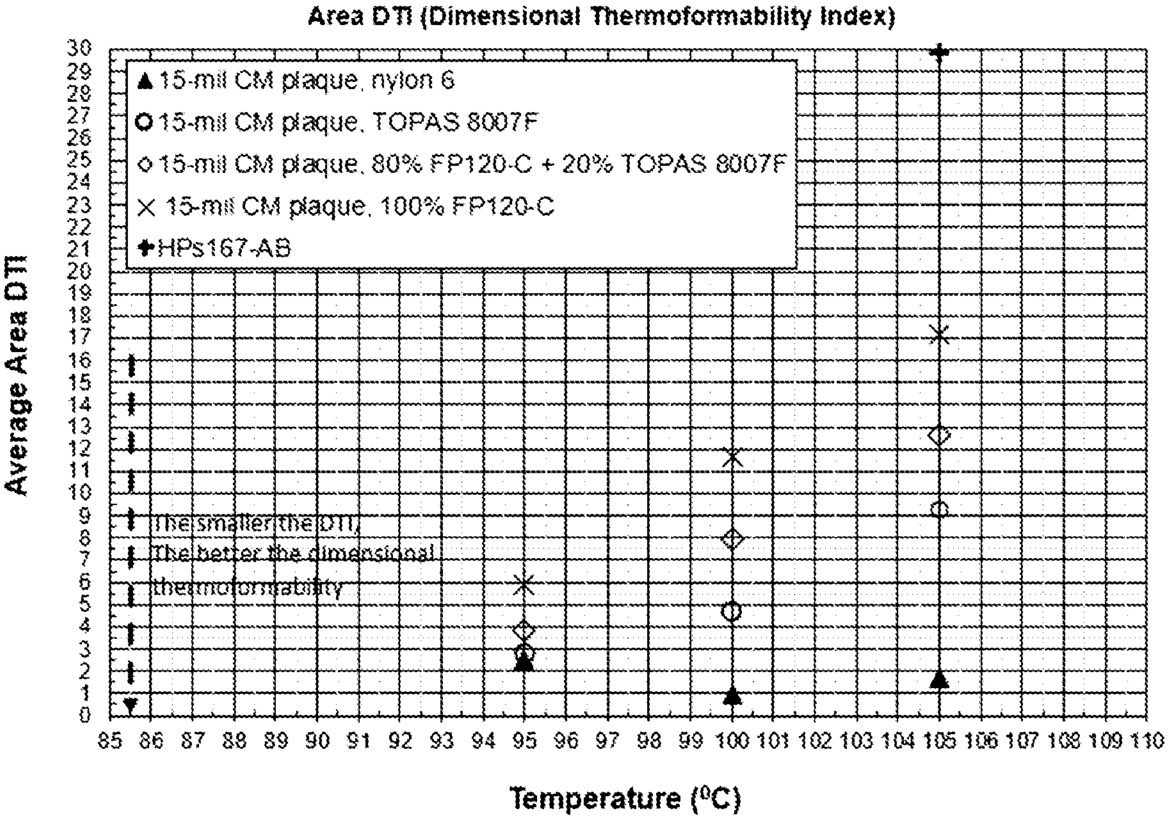
FIG. 6 shows the area Dimensional Thermoformability Index (aDTI) values at 100° C. and 105° C. for polymers known to have varying levels of performance when used in thermoforming applications: a Nylon polymer, a cyclic olefin copolymer, a linear low density polyethylene copolymer and its blend with a cyclic olefin copolymer; and a high density ethylene homopolymer.

To generate the data in FIG. 6, which plots the aDTI against three different temperatures, a polymer such as nylon 6 (commercially available from BASF as ULTRAMID® B40L) was used. Prior to forming the compression molded films used for the tensile testing, the nylon sample was ground into a powder. The powder was compression molded into 15-mil thick, compression-molded films (see above) and stored in a desiccator with a desiccant to prevent moisture absorption. The nylon film, so stored were used in the high temperature tensile experiments.

To establish a baseline ranking system, the calculated area DTI values for 15 mil thick, monolayer films made from a nylon polymer (e.g. nylon 6), a cyclic olefin copolymer (e.g. TOPAS 8007F), a traditional unimodal polyethylene copolymer (e.g. FP-120-C) and its melt blend with a cyclic olefin copolymer (e.g. 80 wt % FP120-C+20 wt % TOPAS 8007F), and a polyethylene homopolymer (e.g. HPs167-AB), were plotted for 95° C., 100° C. and 105° C., as shown in FIG. 6. At all three of the temperatures tested, the ranking of the area DTI values, was found to be consistent with what is known from to persons skilled in the art with regard to the performance of these materials in industrial thermoforming processes (e.g. the thermoforming of the materials into multilayer film structures). Hence, as shown in FIG. 6, the aDTI values established for these resins followed what is generally known to persons skilled in the art with regard to thermoformability: Nylon-6 had a relatively low aDTI; TOPAS 8007 and its blend with a traditional unimodal polyethylene copolymer had an intermediate aDTI; the traditional unimodal polyethylene copolymer had an even higher aDTI; and the HPs167-AB had the highest aDTI. Accordingly, these resins establish some benchmark values for the aDTI parameter against which a polyethylene composition (or other resin) could be compared. FIG. 6 also shows that aDTI values have a greater difference between materials when measured at a higher temperature such as 105° C. As a result, when determining how other polymer materials would perform, relative to those plotted in FIG. 6, their aDTI values were measured at 105° C. (which is slightly lower than the upper temperature typically used for the thermoforming of a polyethylene multilayer film).

Table 4 shows the aDTI of five ethylene-vinylcyclohexane copolymers of the present disclosure (Inv. Examples 1-5) as well as for several other polymers for comparison purposes. In addition to TOPAS 8007F, and Nylon 6, the data in Table 5 shows the relative aDTI values for a conventional polyethylene copolymer (FP120-C, a linear low density ethylene copolymer with a density of 0.920 g/cm$^3$ and a melt index, I2 of about 1 g/10 min, commercially available from NOVA Chemicals), a polyethylene homopolymer (HPs167-AB, an ethylene homopolymer with a density of 0.967 g/cm$^3$ and a melt index, I2 of about 1 g/10 min, commercially available from NOVA Chemicals) and a blend of a traditional polyethylene copolymer with a cyclic olefin copolymer (80 wt % FP120-C+20 wt % TOPAS 8007F).

TABLE 4

Area Dimensional Thermoformability Index (aDTI) of Thermoformable Film

| Example No. | Area DTI at 105° C. |
|---|---|
| Inv. 1 | 1.35 |
| Inv. 2 | 1.90 |
| Inv. 3 | 0.78 |
| Inv. 4 | 0.83 |
| Inv. 5 | 1.27 |
| Nylon 6 (Comparative) | 1.67 |
| TOPAS 8007F (Comparative) | 9.24 |
| FP120-C (Comparative) | 17.12 |
| 80 wt % FPs120-C + 20 wt % TOPAS 8007F (Comparative) | 12.68 |
| HPs167-AB (Comparative) | 29.80 |

A person skilled in the art will recognize from the data provided in Table 6, that the ethylene-vinylcyclohexane copolymers of Examples 1-5 have an aDTI at 105° C. which is dramatically lower than the comparative polyethylene copolymers. The area DTI at 105° C. for Inv. Examples 1-5 which both have a relatively high crystallinity (Xc of greater than 38%) was well below about 15. Indeed, as shown by the data in Table 5, the ethylene-vinylcyclohexane copolymers of Inv. Examples 1-5, have an area DTI at 105° C. value which is comparable to that measured for a nylon polymer, which is known in the prior art for its superior performance in thermoformable film applications (see for example, Xiao-Chuan Wang and Mini Boparai, *Annual Technical Conference of the Society of Plastics Engineers*, May 16-20, 2010, Orlando, Florida, USA). Accordingly, a person skilled in the art would expect the ethylene-vinylcyclohexane copolymers of the present disclosure to perform relatively well when used in thermoforming applications.

Figure 7:
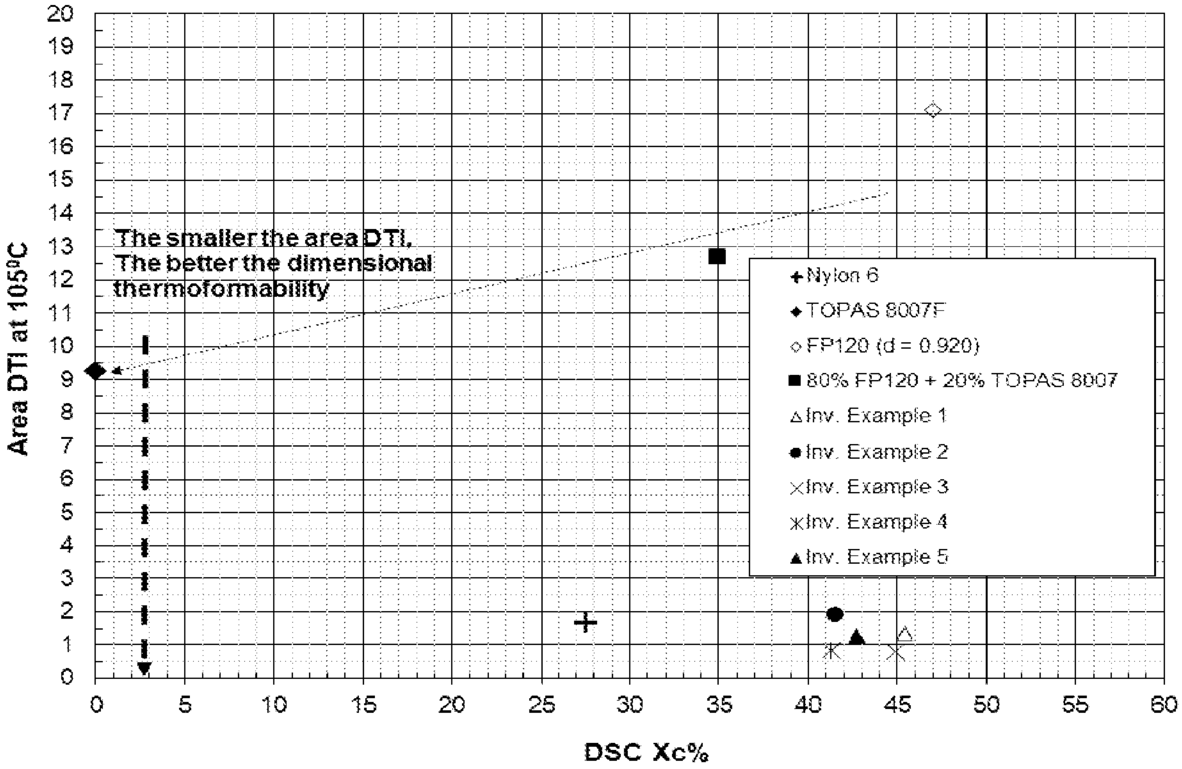
FIG. 7 shows a plot of the area Dimensional Thermoformability Index (aDTI) at 105° C. vs crystallinity (the Xc in % determined by DSC) for ethylene-vinylcyclohexane copolymers made according to the present disclosure and for various comparative polymers known to have varying levels of performance when used in thermoforming applications: a Nylon polymer, a cyclic olefin copolymer, a linear low density polyethylene copolymer and its blend with a cyclic olefin copolymer.

FIG. 7 shows a plot of the area Dimensional Thermoformability Index (aDTI) at 105° C. vs crystallinity (the Xc in % determined by DSC) for ethylene-vinylcyclohexane copolymers made according to the present disclosure and for various comparative polymers known to have varying levels of performance when used in thermoforming applications: a Nylon polymer, a cyclic olefin copolymer, a linear low density polyethylene copolymer and its blend with a cyclic olefin copolymer. The data in FIG. 7 shows, that for polymers having relatively high levels of crystallinity (Xc>38% in a DSC analysis), the ethylene-vinylcyclohexane copolymers of the present disclosure have particularly good (i.e. low) aDTI values. Compare for example with FP120-C which has a Xc value above 38%, but which also has a much higher aDTI values, at 17.1%, than the ethylene-vinylcyclohexane copolymers of the present disclosure.

EQUIVALENTS

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

INDUSTRIAL APPLICABILITY

A bridged hafnocene catalyst is utilized to copolymerize ethylene with vinylcyclohexane. The resultant copolymers, which have high degrees of crystallinity have useful thermoformability properties.

The invention claimed is:

1. A process for the copolymerization of ethylene and vinylcyclohexane wherein the process is carried out using a polymerization catalyst system comprising:

a bridged hafnocene having the formula (I):

(I)

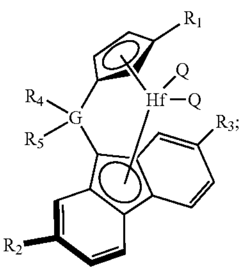

and a catalyst activator;

wherein:

G is C, Si, Ge, Sn, or Pb;

$R_1$ is H, an unsubstituted $C_{1-20}$ hydrocarbyl radical, a substituted $C_{1-20}$ hydrocarbyl radical, a $C_{1-20}$ alkoxy radical, or a $C_{6-10}$ aryl oxide radical;

$R_2$ and $R_3$ are independently H, a $C_{1-20}$ hydrocarbyl radical, a $C_{1-20}$ alkoxy radical, or a $C_{6-10}$ aryl oxide radical;

$R_4$ and $R_5$ are independently H an unsubstituted $C_{1-20}$ hydrocarbyl radical, a substituted $C_{1-20}$ hydrocarbyl radical, a $C_{1-20}$ alkoxy radical, or a $C_{6-10}$ aryl oxide radical; and Q is independently an activatable leaving group ligand;

the catalyst activator comprises an alkylaluminoxane, an ionic activator, and a hindered phenol; and the process produces an ethylene-vinylcyclohexane copolymer having a vinylcyclohexane content of from 0.25 to 5 mol %; a crystallinity (Xc) of >38%; a phase angle (δ) at a complex modulus (G*) of 10,000 Pa, of ≤75°; and an average melt strain hardening index (MSHI) of ≤1.7.

2. The process of claim 1, wherein the ethylene-vinylcyclohexane copolymer has an area dimensional thermoformability index (aDTI) at 105° C. of less than 7.0.

3. The process of claim 1, wherein the ethylene-vinylcyclohexane copolymer has a density of from 0.900 to 0.965 $g/cm^3$.

* * * * *